(12) United States Patent
Makino

(10) Patent No.: US 8,451,355 B2
(45) Date of Patent: May 28, 2013

(54) IMAGE SENSOR, ELECTRONIC APPARATUS, AND DRIVING METHOD OF ELECTRONIC APPARATUS

(75) Inventor: Eiji Makino, Kanagawa (JP)

(73) Assignee: Sony Corporation, Tokyo (JP)

( * ) Notice: Subject to any disclaimer, the term of this patent is extended or adjusted under 35 U.S.C. 154(b) by 831 days.

(21) Appl. No.: 12/119,883

(22) Filed: May 13, 2008

(65) Prior Publication Data

US 2008/0284876 A1    Nov. 20, 2008

(30) Foreign Application Priority Data

May 17, 2007   (JP) ................................. 2007-132096

(51) Int. Cl.
  *H04N 5/335*   (2011.01)
  *H04N 3/14*    (2006.01)
(52) U.S. Cl.
  USPC .......................................... 348/296; 348/308
(58) Field of Classification Search
  USPC ....... 348/296, 297, 302, 308, 294; 250/208.1; 257/431, 432, 444, 445; 365/230.06
  See application file for complete search history.

(56) References Cited

U.S. PATENT DOCUMENTS

| | | | | |
|---|---|---|---|---|
| 6,847,398 | B1* | 1/2005 | Fossum | 348/296 |
| 6,920,078 | B2* | 7/2005 | Cho | 365/230.06 |
| 7,511,752 | B2* | 3/2009 | Kurane | 348/296 |
| 2002/0089597 | A1* | 7/2002 | Pearson | 348/308 |
| 2005/0057674 | A1* | 3/2005 | Krymski et al. | 348/296 |
| 2006/0192263 | A1* | 8/2006 | Inagaki et al. | 257/443 |
| 2006/0203112 | A1* | 9/2006 | Aoki | 348/294 |
| 2008/0055439 | A1* | 3/2008 | Mabuchi | 348/296 |
| 2008/0128598 | A1* | 6/2008 | Kanai et al. | 250/226 |
| 2009/0219421 | A1* | 9/2009 | Altice, Jr. et al. | 348/296 |

FOREIGN PATENT DOCUMENTS

| | | |
|---|---|---|
| JP | 03-276675 | 12/1991 |
| JP | 2004-166269 | 6/2004 |
| JP | 2004 166269 | 6/2004 |
| JP | 2006 054276 | 2/2006 |

OTHER PUBLICATIONS

Japanese Office Action dated Feb. 7, 2012 for Japanese Application No. 2007-132096.

* cited by examiner

*Primary Examiner* — Aung S Moe
(74) *Attorney, Agent, or Firm* — Dentons US LLP

(57) ABSTRACT

An image sensor that supplies a control signal together with an address specifying each of a plurality of pixels arrayed in a pixel array with predetermined rows and columns to thereby perform an electronic shutter operation on a pixel corresponding to the address or perform reading of a pixel signal of a pixel corresponding to the address, is disclosed. The sensor includes: address generating means for generating a shutter row address specifying a row of pixels, on which an electronic shutter operation is to be performed within one horizontal period, among the pixels arrayed in the pixel array and a read row address specifying a row of pixels on which reading of a pixel signal is to be performed within the same one horizontal period; first storage means for storing the shutter row address; and second storage means for storing the read row address.

10 Claims, 13 Drawing Sheets

IMAGE SENSOR, ELECTRONIC APPARATUS, AND DRIVING METHOD OF ELECTRONIC APPARATUS

CROSS REFERENCES TO RELATED APPLICATIONS

The present invention contains subject matter related to Japanese Patent Application JP 2007-132096 filed in the Japanese Patent Office on May 17, 2007, the entire contents of which being incorporated herein by reference.

BACKGROUND OF THE INVENTION

1. Field of the Invention

The present invention relates to an image sensor, an electronic apparatus, and a driving method of an electronic apparatus, and more particularly, to an image sensor, an electronic apparatus, and a driving method of an electronic apparatus capable of obtaining a high-quality image with a simple configuration.

2. Description of the Related Art

A CMOS (complementary metal oxide semiconductor) image sensor and the like amplify signal charges accumulated in a photodiode, which is a photoelectric conversion element, with an active element and read the amplified signal charges as image information.

In an X-Y address type solid-state imaging device, such as a CMOS image sensor, for example, a plurality of pixel transistors are arrayed in a matrix. In addition, accumulation of signal charges corresponding to incident light is started for every line (row) or every pixel and signals having a current or a voltage based on the accumulated signal charges are read sequentially from each pixel by address designation. Thus, the X-Y address type solid-state imaging device is characterized in that the order of reading signals of pixels can be relatively freely set since a signal can be taken out from a pixel at an arbitrary position by address designation, unlike a CCD (charge coupled device) image sensor that sequentially reads signal charges obtained in pixels by selecting a pixel with a shift register.

For example, in a technique of imaging a still image represented by a digital still camera, an "all pixel read mode" in which a still image is obtained by independently reading pixel information on all pixels using a CMOS type solid-state imaging device, which has a plurality of pixels, as an imaging device is well known. In addition to the mode, an operation of, for example, a "thinning-out read mode" in which reading is performed while skipping some rows and columns can also be performed.

Moreover, in a CMOS image sensor, a shutter operation (electronic shutter) is performed in order to increase the precision of signal charges obtained in pixels. In response to the shutter operation, electric charges accumulated in pixels are once swept out. For example, in the case of reading a pixel on the basis of the "thinning-out read mode" mentioned above, a more complicated shutter operation is needed as a measure against leakage of electric charges from adjacent pixels and the like.

For example, in the thinning-out read mode, a so-called anti-blooming shutter for an operation of sweeping out electric charges accumulated in pixels on a row (thinned-out row) where reading of a signal of a pixel is not performed is required in addition to a shutter operation for specifying an exposure time. If the anti-blooming shutter is not performed, a sweeping operation on electric charges of pixels on a thinned-out row does not occur. Accordingly, electric charges overflow from a photodiode and the electric charges leak to adjacent pixels. As a result, a problem, such as color mixing, occurs.

Furthermore, a control for optimization of the exposure amount or the like is also performed by changing an exposure time based on an electronic shutter in the unit of a frame according to the brightness during a camera operation. In this case, the number of electronic shutters at the same timing may increase when the exposure amount has changed.

Thus, in the CMOS image sensor, selection of complicated read rows or shutter rows is needed. In order to actually give a large degree of freedom to a read order, a control mechanism that performs address designation according to each mode is needed. Accordingly, as a pixel row or column selection circuit, not a shift register but a decoder is used in many cases. The reason is that in the case of a shift register, rows or columns need to be sequentially selected to some extent, and accordingly, arbitrary rows or columns cannot be freely selected.

In the case of using a decoder, a vertical selection decoder that selects a row of pixels performs selection of a read row and selection of a shutter row in a 1 H period (one horizontal scanning period), such that read of electric charges of each pixel and a sweeping operation on electric charges are performed.

For example, in a ½ thinning-out read mode, when a change in exposure time caused by the above-described anti-blooming shutter and electronic shutter is taken into consideration, it is necessary to generate electronic shutter rows simultaneously at maximum four places at timing (1 H period) at which one read row is selected in order to obtain a high-quality image without poor exposure. Accordingly, since four decoders are needed to select four electronic shutter rows and one decoder is needed to select one read row, a total of five decoders are needed. As a result, the size of a circuit increases.

For this reason, it has been proposed to perform time-division multiplexing on addresses selected by a decoder such that a plurality of electronic shutter rows or read rows are selected with one decoder (for example, refer to JP-A-2004-166269).

SUMMARY OF THE INVENTION

However, in a technique disclosed in JP-A-2004-166269, it is possible to make the size of a circuit small but it is necessary to write all electronic shutter selection rows in a latch during a horizontal blanking period. For this reason, for example, when the number of electronic shutter rows to be simultaneously selected increases, it is necessary to make a horizontal blanking period longer. As a result, reading at a high-speed frame rate becomes difficult.

Therefore, in view of the above, it is desirable to obtain a high-quality image with a simple configuration.

According to an embodiment of the present invention, there are provided an image sensor, an electronic apparatus, and a driving method of an electronic apparatus that supply a control signal together with an address specifying each of a plurality of pixels arrayed in a pixel array with predetermined rows and columns to thereby perform an electronic shutter operation on a pixel corresponding to the address or perform reading of a pixel signal of a pixel corresponding to the address including: address generating means for generating a shutter row address specifying a row of pixels, on which an electronic shutter operation is to be performed within one horizontal period, among the pixels arrayed in the pixel array and a read row address specifying a row of pixels on which reading of a pixel signal is to be performed within the same one horizontal period; first storage means for storing the shutter row address generated by the address generating means; and second storage means for storing the read row address generated by the address generating means. The address generating means generates the shutter row address corresponding to the read row within an effective period of one horizontal period for which a selection pulse of the read row is in an ON state.

The address generating means may generate the plurality of shutter row addresses corresponding to the one read row address.

The address generating means may generate the read row and the shutter row address corresponding to the read row address within one horizontal period through time-division multiplexing.

The pixel array may be a pixel array using a pixel sharing technique of sharing floating diffusion of a pixel.

The address generating means may generate a plurality of read row addresses to be read within one horizontal period and generate the plurality of shutter row addresses corresponding to the plurality of read row addresses.

The address generating means may simultaneously generate a plurality of read row addresses to be read within one horizontal period and simultaneously generate the plurality of shutter row addresses corresponding to the plurality of read row addresses.

Each of the first storage means and the second storage means may be configured to include a plurality of S-R latches corresponding to respective rows of pixels arrayed in the pixel array and the shutter row address or the read row address may be stored when the S-R latches hold address signals supplied to the S-R latches corresponding to a row of pixels of the shutter row address or the read row address, the address signals being address signals supplied to the S-R latches on the basis of the shutter row address or the read row address generated by the address generating means.

Each of the plurality of S-R latches may be reset by a reset pulse, which is supplied once at predetermined timing within one horizontal period, and may hold the address signals by a set pulse that is supplied once or a plural number of times within one horizontal period corresponding to timing at which the address signals are supplied after the reset pulse is supplied.

According to the embodiment of the present invention, a shutter row address specifying a row of pixels, on which an electronic shutter operation is to be performed within one horizontal period, among the pixels arrayed in the pixel array and a read row address specifying a row of pixels on which reading of a pixel signal is to be performed within the same one horizontal period are generated, the generated shutter row address is stored, the generated read row address is stored, and the shutter row address corresponding to the read row is generated within an effective period of one horizontal period for which a selection pulse of the read row is in an ON state.

In the present invention, it is possible to obtain a high-quality image with a simple configuration.

DESCRIPTION OF THE PREFERRED EMBODIMENTS

Figure 1:
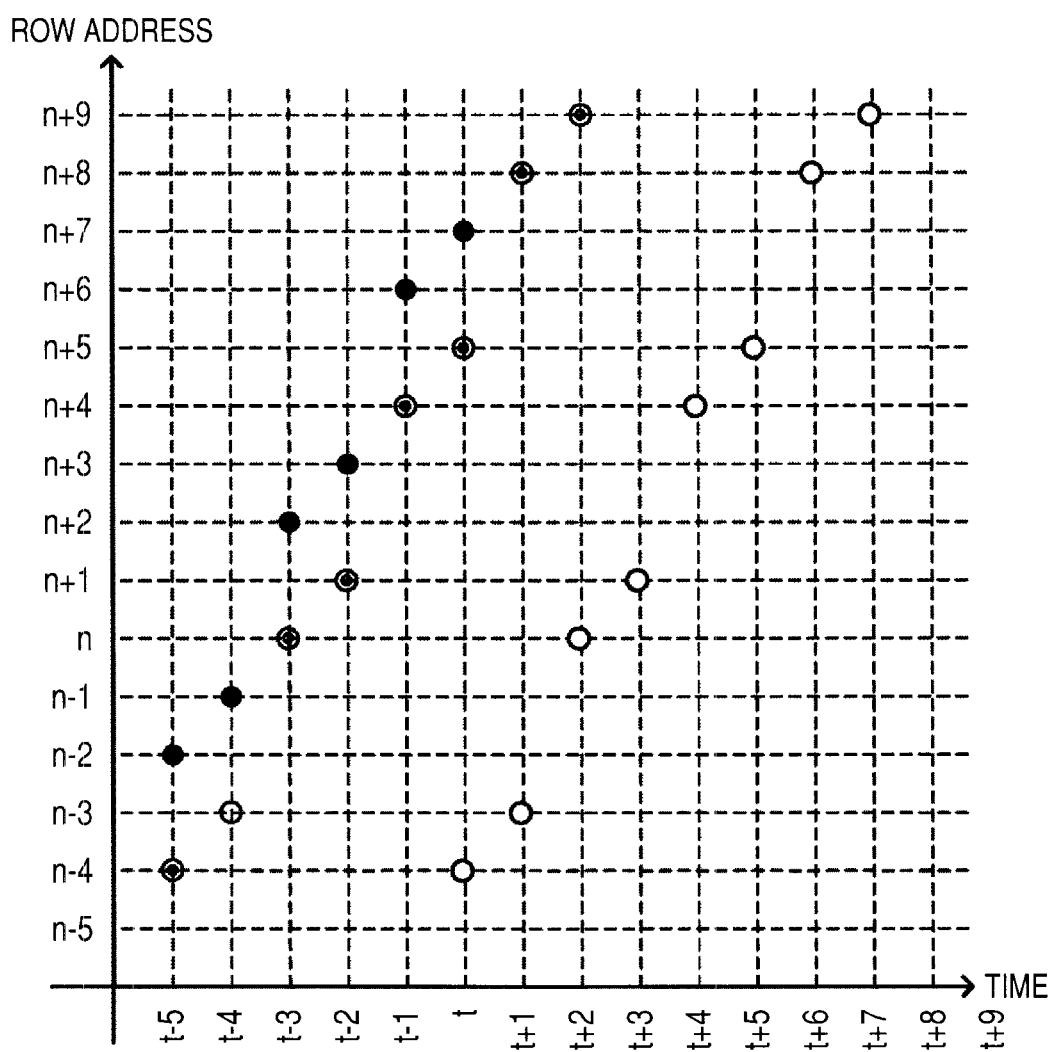
FIG. 1 is a view explaining reading of a signal of a pixel and an electronic shutter.

Hereinafter, embodiments of the present invention will be described. The correspondence relationship between configuration requirements of the present invention and embodiments described in this specification or drawings is as follows. This description is made to confirm that embodiments supporting the present invention are described in this specification or drawings. Therefore, even if there exists an embodiment that is described in this specification or drawings but not described herein as what corresponds to the configuration requirements of the present invention, the embodiment is not to be interpreted as an embodiment which does not correspond to the configuration requirements. In contrast, even if an embodiment is described herein as what corresponds to the configuration requirements, the embodiment is not to be interpreted as an embodiment which does not correspond to a configuration requirement other than the configuration requirements.

An image sensor according to an embodiment of the present invention is an image sensor that supplies a control signal together with an address specifying each of a plurality of pixels arrayed in a pixel array with predetermined rows and columns to thereby perform an electronic shutter operation on a pixel corresponding to the address or perform reading of a pixel signal of a pixel corresponding to the address. The image sensor includes: address generating means (for example, vertical selection decoder 223 shown in FIG. 6) that generates a shutter row address specifying the row of a pixel, on which an electronic shutter operation is to be performed within one horizontal period, among the pixels arrayed in the pixel array and a read row address specifying the row of a pixel on which reading of a pixel signal is to be performed within the same one horizontal period; first storage means (for example, a latch circuit 224 shown in FIG. 6) that stores the shutter row address generated by the address generating means; and second storage means (for example, a latch circuit 225 shown in FIG. 6) that stores the read row address generated by the address generating means. The address generating means generates the shutter row address corresponding to the read row within an effective period of one horizontal period for which a selection pulse of the read row is in an ON state.

The image sensor may be configured such that the address generating means (for example, a circuit shown in FIG. 11) simultaneously generates a plurality of read row addresses, which are to be read within one horizontal period, and simultaneously generates a plurality of shutter row addresses corresponding to the plurality of read row addresses.

Hereinafter, embodiments of the present invention will be described with reference to the accompanying drawings.

In an X-Y address type solid-state imaging device, such as a CMOS (complementary metal oxide semiconductor) image sensor, for example, a plurality of pixel transistors are arrayed in a matrix. In addition, accumulation of signal charges corresponding to incident light is started for every line (row) or every pixel and signals having a current or a voltage based on the accumulated signal charges are read sequentially from each pixel by address designation. Thus, the X-Y address type solid-state imaging device is characterized in that the order of reading signals of pixels can be relatively freely set since a signal can be taken out from a pixel at an arbitrary position by address designation, unlike a CCD (charge coupled device) image sensor that sequentially reads signal charges obtained in pixels by selecting a pixel with a shift register.

For example, in a digital still camera, an "all pixel read mode" in which a still image is obtained by independently reading pixel information on all pixels using a CMOS type solid-state imaging device, which has a plurality of pixels, as an imaging device is well known. In addition to the mode, an operation of, for example, a "thinning-out read mode" in which reading is performed while skipping some rows and columns can also be performed.

Moreover, in a CMOS image sensor, a shutter operation (electronic shutter) is performed in order to increase the precision of signal charges obtained in pixels. In response to the shutter operation, electric charges accumulated in pixels are output to be once swept out. For example, in the case of reading a pixel on the basis of the "thinning-out read mode" mentioned above, a more complicated shutter operation is needed as a measure against leakage of electric charges from adjacent pixels and the like.

For example, in the thinning-out read mode, a so-called anti-blooming shutter for an operation of sweeping away electric charges accumulated in pixels on a row (thinned-out row) where reading of a signal of a pixel is not performed is required in addition to a shutter operation for specifying an exposure time.

FIG. 1 is a view explaining reading of a signal of a pixel and an electronic shutter. For example, FIG. 1 illustrates an example of a ½ thinning-out read mode in which pixels corresponding to first and second rows are read and pixels corresponding to second and third pixels are not read. In FIG. 1, a horizontal axis indicates time, a vertical axis indicates a row address of a pixel, and a unit of time is a 1 H period (one horizontal scanning period).

Reading of a signal of a pixel is performed at the position shown in a white circle in the drawing. For example, an n-th row pixel is read at time t+2 (in practice, 1 H period starting from time t+2) and an (n+1)-th row pixel is read at time t+3.

A shutter operation for specifying an exposure time is performed at the position shown by a double circle in the drawing. For example, a shutter operation is performed at time t−3 in the n-th row pixel and the shutter operation is performed at time t−2 in the (n+1)-th row pixel, such that electric charges accumulated in each of the pixels are once swept out. Then, electric charges accumulated in each pixel are read as a signal of a pixel.

In addition, a shutter operation as anti-blooming measures is performed at the position shown by a black circle in the drawing. For example, a shutter operation is performed at time t−3 in an (n+2)-th row pixel, which is a pixel on which reading is not performed, and the shutter operation is performed at time t−2 in an (n+3)-th row pixel, which is a pixel on which reading is not performed, such that electric charges accumulated in each of the pixels are once swept out.

If the anti-blooming shutter is not performed, a sweeping operation on electric charges of pixels on a thinned-out row does not occur. Accordingly, electric charges overflow from a photodiode and the electric charges leak to adjacent pixels. As a result, a problem, such as color mixing, occurs.

Furthermore, a control for optimization of the exposure amount or the like is also performed by changing an exposure time based on an electronic shutter in the unit of a frame according to the brightness during a camera operation. In this case, the number of electronic shutters at the same timing may increase when the exposure amount has changed.

Figure 2:
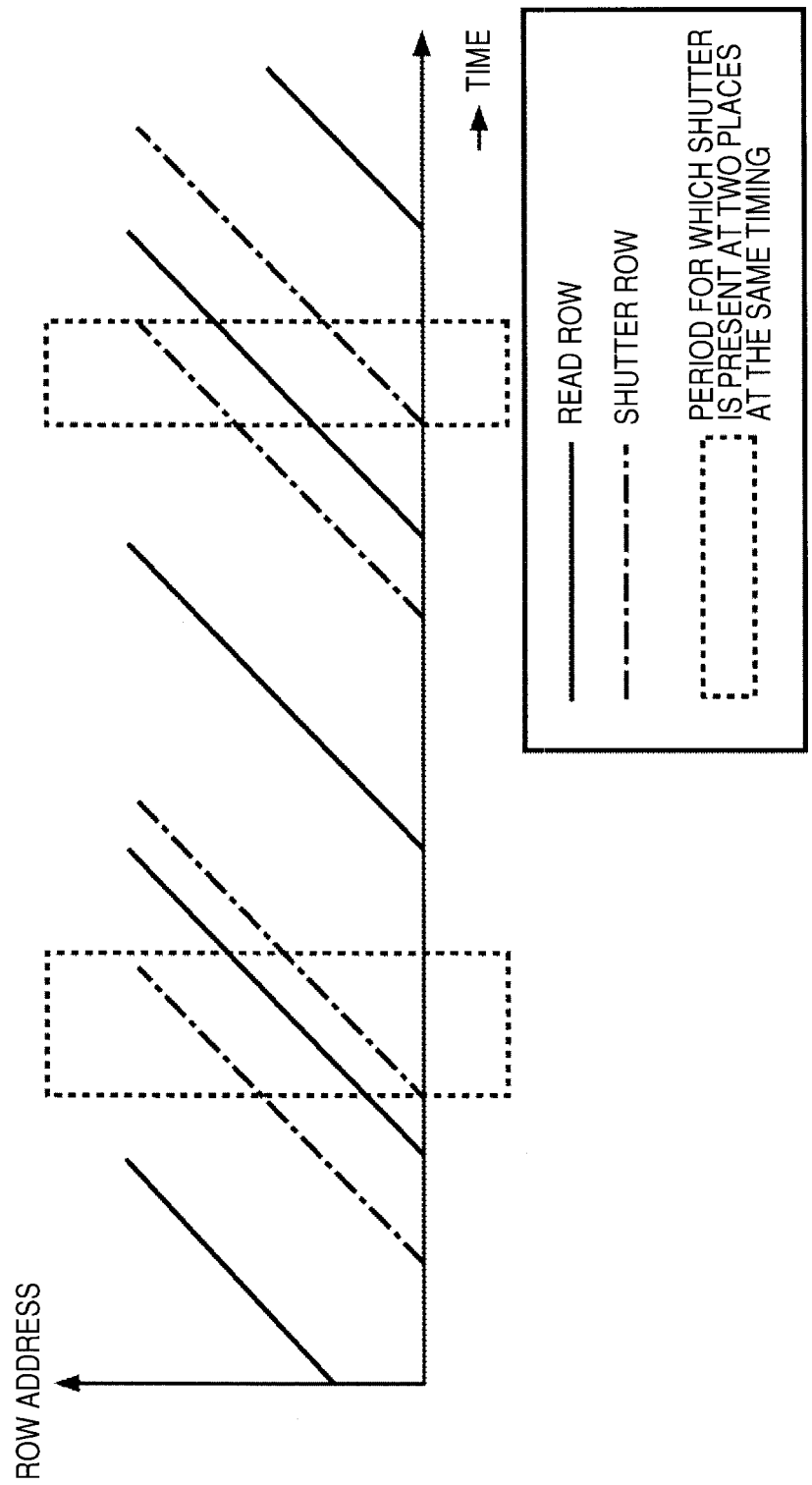
FIG. 2 is a view explaining the relationship between a read row of a pixel and an electronic shutter row when an exposure time based on an electronic shutter has been changed.

FIG. 2 is a view explaining the relationship between a read row of a pixel and an electronic shutter row when an exposure time based on an electronic shutter has been changed. In FIG. 2, a horizontal axis indicates time and a vertical axis indicates a row address of a pixel in the same manner as the case shown in FIG. 1, but the position of a pixel on a read row or a pixel on a shutter row is simply illustrated. The pixel on a read row is expressed by a solid line in the drawing, and the pixel on the electronic shutter row is expressed by a broken line in the drawing. In addition, the broken line in the drawing collectively indicates two shutter operations of the shutter operation, which is shown by the double circle in FIG. 1, and the shutter operation shown by the black circle. Referring to FIG. 2, in a period of time surrounded by a frame of a dotted line, two broken lines and one solid line exist at the same time. Accordingly, a shutter operation is performed on four rows of pixels within the same horizontal scanning period as reading pixels on one row.

Figure 3:
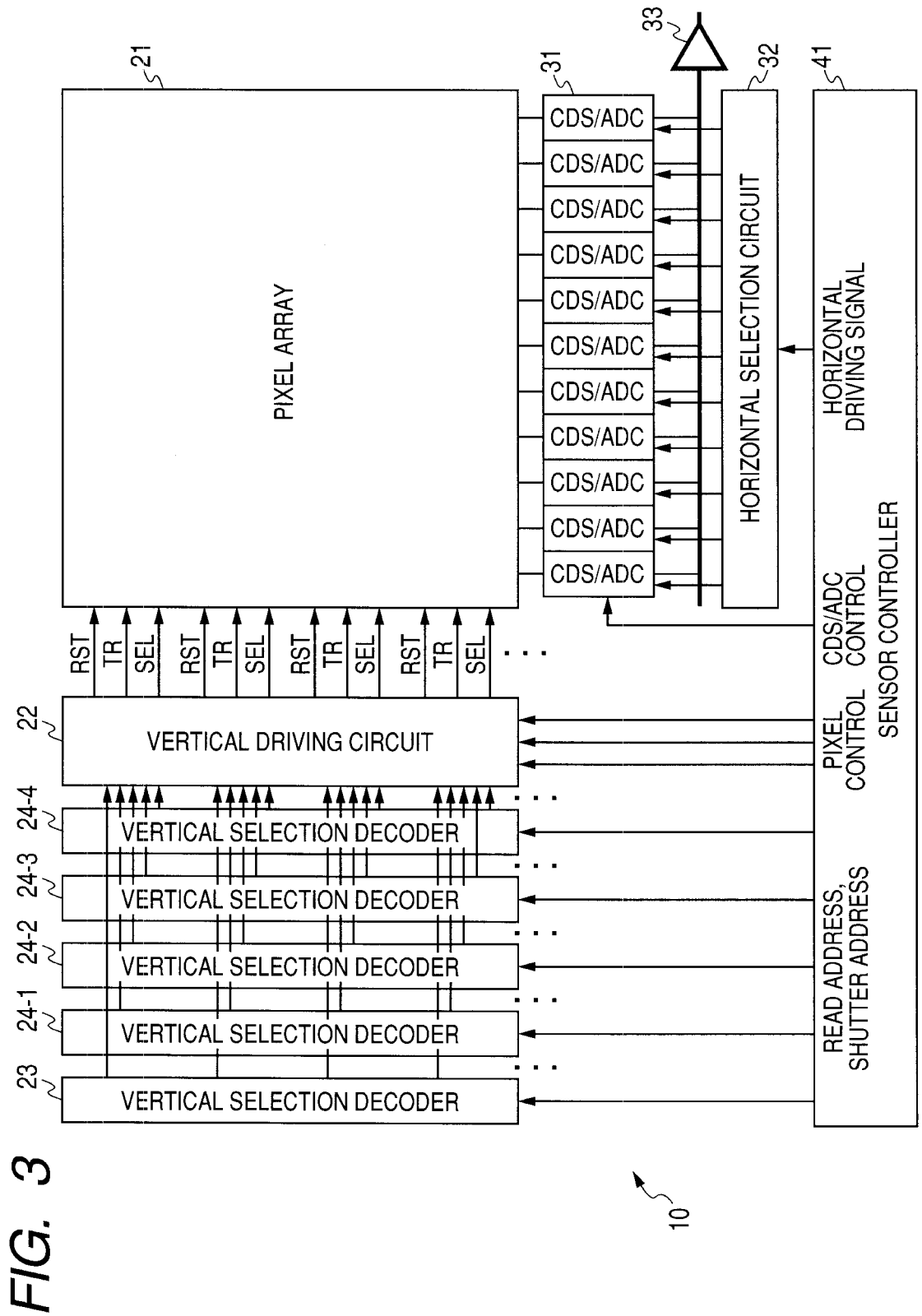
FIG. 3 is a block diagram illustrating an example of the configuration of an image sensor in which a shutter operation can be performed on four rows of pixels within the same horizontal scanning period as reading pixels on one row.

FIG. 3 is a block diagram illustrating an example of the configuration of an image sensor 10 in which a shutter operation can be performed on four rows of pixels within the same horizontal scanning period as reading pixels on one row. The image sensor 10 is configured as a CMOS image sensor, for example.

In FIG. 3, a pixel array 21 is configured to include a plurality of pixels arrayed on a predetermined number of rows in the vertical direction and a predetermined number of columns in the horizontal direction. A photodiode that generates electric charges by photoelectrically converting exposed light and accumulates the electric charges is provided in each of the pixels, and an MOS transistor switch is connected to the photodiode. The MOS transistor switch amplifies electric charges accumulated in the photodiode on the basis of a pulse signal supplied and outputs the amplified electric charges as a signal (pixel signal corresponding to each pixel).

A vertical driving circuit 22 is configured to supply a driving signal to pixels on a predetermined one row of the pixel array 21. The vertical driving circuit 22 supplies to each pixel of the pixel array 21 an SEL signal for selecting pixels on a predetermined one row of the pixel array 21, a TR signal for outputting electric charges accumulated in the pixels selected by the SEL signal, and an RST signal for resetting the pixels selected by the SEL signal. In addition, signal lines used to supply the SEL signal, the TR signal, and the RST signal output from the vertical driving circuit 22 are provided as many as rows of pixels of the pixel array 21 and are connected to pixels on each row of the pixel array 21.

A vertical selection decoder 23 generates an address signal specifying pixels on a row, from which pixel signals are to be read, among the pixels of the pixel array 21 on the basis of a control signal supplied from a sensor controller 41 and supplies the address signal to the vertical driving circuit 22.

Vertical selection decoders 24-1 to 24-4 generate address signals specifying pixels on a row, on which a shutter operation of a pixel is to be performed, among the pixels of the pixel array 21 on the basis of a control signal supplied from the sensor controller 41 and supplies the address signals to the vertical driving circuit 22.

That is, four rows of pixels, on which a shutter operation is to be performed, are selected by the vertical selection decoders 24-1 to 24-4 within the same horizontal scanning period as reading pixels on one row selected by the vertical selection decoder 23. Accordingly, the SEL signal, the TR signal, and the RST signal corresponding to one read row and the SEL signal, the TR signal, and the RST signal corresponding to four electronic shutter rows are supplied from the vertical driving circuit 22 to the pixel array 21.

A CDS/ADC 31 is configured to include a converter (ADC: analog digital converter) that converts an analog electric signal, which is obtained when signal charges photoelectrically converted by a photodiode are amplified and output, to a digital signal, and a correlated double sampling (CDS) circuit that removes a noise of an input electric signal and that corrects a variation in an electric signal resulting from a variation in the performance of each element forming a pixel and supplies the corrected signal to the converter.

A horizontal selection circuit 32 selects one predetermined column of the CDS/ADC 31 and outputs a digital signal to an inverter 33.

The sensor controller 41 generates a read address supplied to the vertical selection decoder 23 and shutter addresses supplied to the vertical selection decoders 24-1 to 24-4. In addition, the sensor controller 41 generates the SEL signal, the TR signal, and the RST signal as pixel control signals. In addition, the sensor controller 41 generates a CDS/ADC control signal for controlling the CDS/ADC 31 and a horizontal driving signal for controlling the horizontal selection circuit 32.

By configuring an image sensor as shown in FIG. 3, it becomes possible to perform a shutter operation on four rows of pixels within the same horizontal scanning period as reading pixels on one row. However, since totally five decoders are required, the circuit size is increased. Accordingly, for example, a large layout area is needed.

It may be possible to select a plurality of electronic shutter rows or read rows with one decoder by performing time-division multiplexing on an address (row) selected by the decoder.

Figure 4:
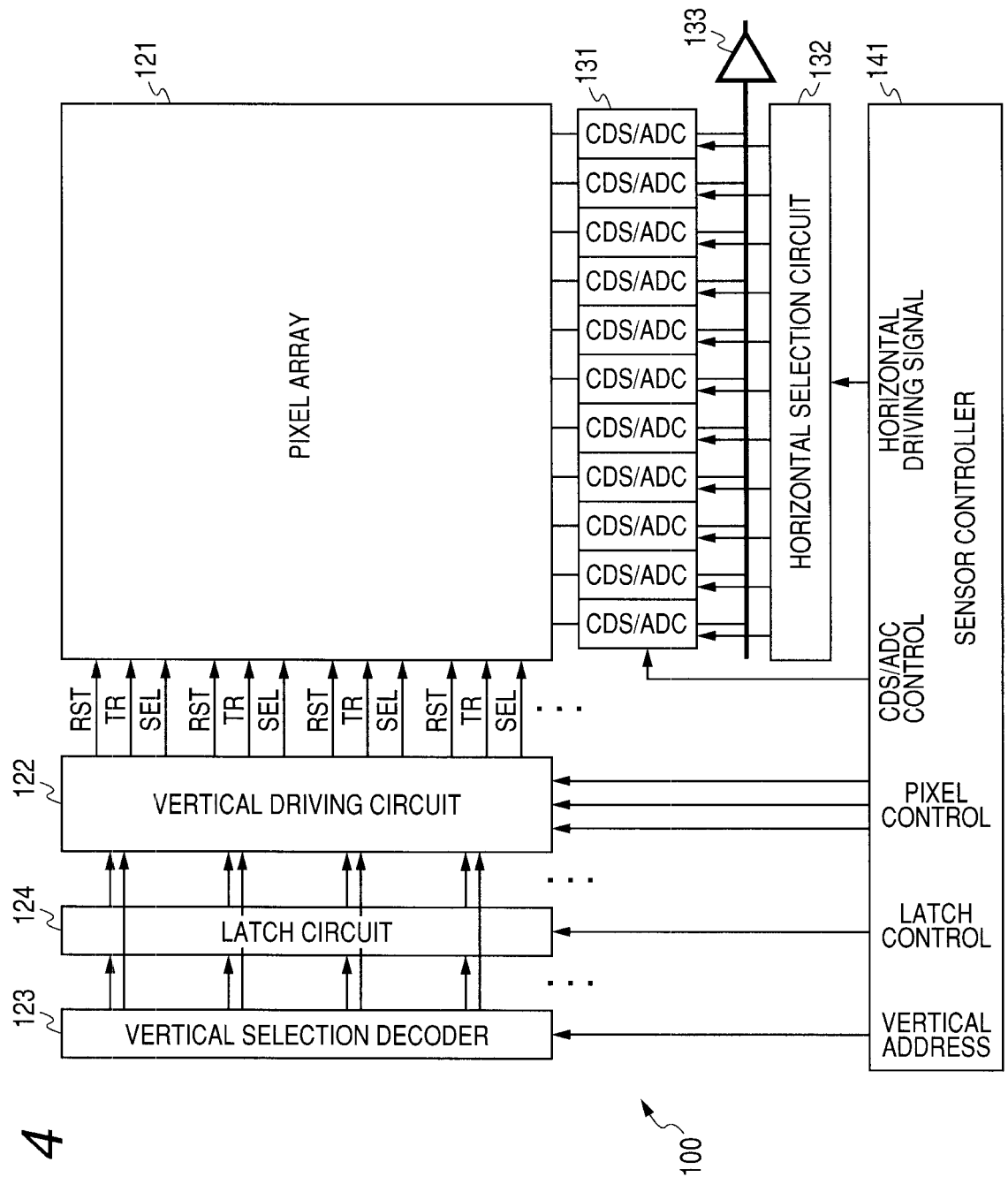
FIG. 4 is a block diagram illustrating an example of the configuration of an image sensor in which time-division multiplexing on an address selected by a decoder is performed.

FIG. 4 is a block diagram illustrating an example of the configuration of an image sensor 100 in which time-division multiplexing on an address (row) selected by a decoder is performed and a plurality of electronic shutter rows or read rows can be selected with one decoder. Since a pixel array 121 and a vertical driving circuit 122 shown in FIG. 4 are the same as the pixel array 21 and the vertical driving circuit 22 shown in FIG. 3, a detailed explanation thereof will be omitted. In addition, since a CDS/ADC 131 to an inverter 133 shown in FIG. 4 are the same as the CDS/ADC 31 to the inverter 33 shown in FIG. 3, a detailed explanation thereof will be omitted.

In the image sensor 100 shown in FIG. 4, a vertical selection decoder 123 generates an address signal specifying pixels on a row, from which pixel signals are to be read, among pixels of the pixel array 121 on the basis of a control signal supplied from a sensor controller 141 and supplies the address signal to the vertical driving circuit 122 and also generates an address signal specifying pixels on a row, on which a shutter operation of a pixel is to be performed, among the pixels of the pixel array 121 on the basis of the control signal supplied from the sensor controller 141 and supplies the address signal to the vertical driving circuit 122. That is, the vertical selection decoder 123 generates an address signal for selecting one read row and four electronic shutter rows within one horizontal scanning period (1 H period) through time-division multiplexing.

A latch circuit 124 is configured to hold the address signal supplied from the vertical selection decoder 123 on the basis of a control signal supplied from the sensor controller 141. That is, the latch circuit 124 holds address signals of four electronic shutter rows corresponding to a read row within a 1 H period. In addition, the latch circuit 124 is provided with S-R latches the number of which is equal to the number of rows of pixels arrayed in the pixel array 121.

Figure 5:
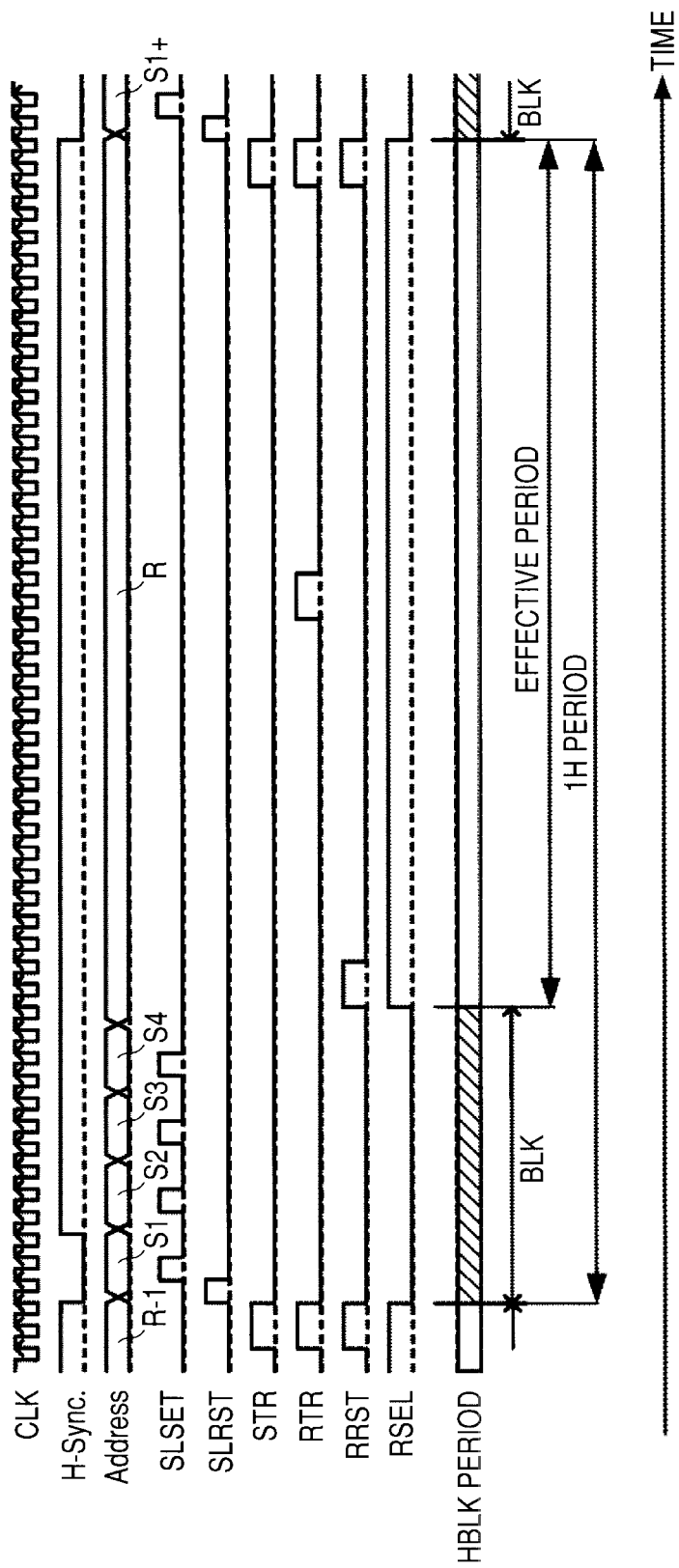
FIG. 5 is a timing chart explaining respective signals in the image sensor shown in FIG. 4.

FIG. 5 is a timing chart explaining respective signals in the image sensor 100 shown in FIG. 4.

In FIG. 4, a CLK signal is a clock signal of the image sensor 100. In addition, an H-Sync signal is a horizontal synchronization signal and is used for synchronization of a 1 H period in the image sensor 100.

An Address signal is an address signal generated by the vertical selection decoder 123. In this example, an Address signal indicating addresses S1 to S4 of an electronic shutter row is generated after an Address signal indicating an address R−1 of a read row, and then an Address signal indicating an address R of a read row is generated. The addresses S1 to S4 and the address R are all generated within a 1 H period. Thus, the vertical selection decoder 123 generates an address of one read row and addresses of four electronic shutter rows within a 1 H period.

An SLSET signal and an SLRST signal are signals that the sensor controller 141 outputs as latch control signals for controlling the latch circuit 124.

In the example shown in FIG. 5, the SLRST signal is first supplied to the latch circuit 124. Then, each of the plurality of S-R latches that form the latch circuit 124 is reset. In addition, the SLSET signal as four pulses is supplied to the latch circuit 124 in a period for which the Address signal serves the addresses S1 to S4. Then, each of the plurality of S-R latches that form the latch circuit 124 holds the Address signal corresponding to each of the addresses S1 to S4. In addition, while the latch circuit 124 is holding the Address signal corresponding to each of the addresses S1 to S4, an SEL signal is supplied from the vertical driving circuit 122 to pixels on each row corresponding to the addresses S1 to S4.

An STR signal is a signal used to output electric charges accumulated in a pixel selected by the SEL signal. The STR signal is a signal for outputting electric charges accumulated in a pixel so that the electric charges are once swept out. A shutter operation is performed when the STR signal is supplied to a pixel selected by the SEL signal. Moreover, in practice, an SRST signal for resetting a pixel is also generated to be supplied at almost the same timing as the STR signal.

In addition, an RTR signal, an RRST signal, and an RSEL signal are pixel control signals that the sensor controller 141 outputs in order to read a signal of a pixel. The RSEL signal is a signal that the sensor controller 141 outputs within an effective period of a 1 H period. For example, when the RTR signal is supplied together with the RSEL signal while the Address signal indicating the address R is being supplied, electric charges accumulated in pixels on a row corresponding to the Address R are output. In this case, the electric charges that have been output are not swept out but output as a signal through processing of the CDS/ADC 131 to the inverter 133. Thus, reading of a signal of a pixel is performed. In addition, for example, when the RRST signal is supplied together with the RSEL signal while the Address signal indicating the address R is being supplied, pixels on a row corresponding to the Address R are reset.

The sensor controller 141 generates a pulse of the RSEL signal by setting a period, for which reading of pixels on a row corresponding to the Address R can be performed, as an effective period and a period, for which reading of the pixels on the row corresponding to the Address R cannot be performed, as a blanking (BLK) period.

In addition, thinning-out read modes include a ¼ thinning-out read mode, a ⅛ thinning-out read mode, and the like as well as the ½ thinning-out read mode described above. In such thinning-out read modes, it is also necessary to perform a shutter operation as anti-blooming measures. In the ¼ thinning-out read mode and the ⅛ thinning-out read mode, the number of rows that are thinned out is increased compared with a case of the ½ thinning-out read mode. As a result, the number of rows of pixels on which a shutter operation is to be performed within the same horizontal scanning period as reading pixels on a predetermined one row also increases naturally. Accordingly, for example, it is necessary to select maximum eight electronic shutter rows within a 1 H period in the ¼ thinning-out read mode and to select maximum sixteen electronic shutter rows within a 1 H period in the ⅛ thinning-out read mode.

Thus, in the case where the number of electronic shutter rows has increased, the number of addresses of electronic shutter selection rows indicated by the Address signal increases when performing image photographing processing in the image sensor 100 shown in FIG. 4. Accordingly, for example, a BLK period shown in FIG. 5 becomes longer. For this reason, since it is also necessary to make a 1 H period long, the number of clocks in a 1 H period should be larger than that in the case shown in FIG. 5 in the ¼ thinning-out read mode and the ⅛ thinning-out read mode.

When a 1 H period becomes long, for example, a frame rate in photographing an image becomes slow. That is, in the case of the configuration shown in FIG. 4, for example, it may not be possible to perform photographing at a high-speed frame rate depending on a set thinning-out read mode.

Therefore, in the embodiment of the present invention, there is adopted a configuration in which, for example, photographing can be performed at a high-speed frame rate by preventing a BLK period from becoming long even if the number of electronic shutter rows increases.

Figure 6:
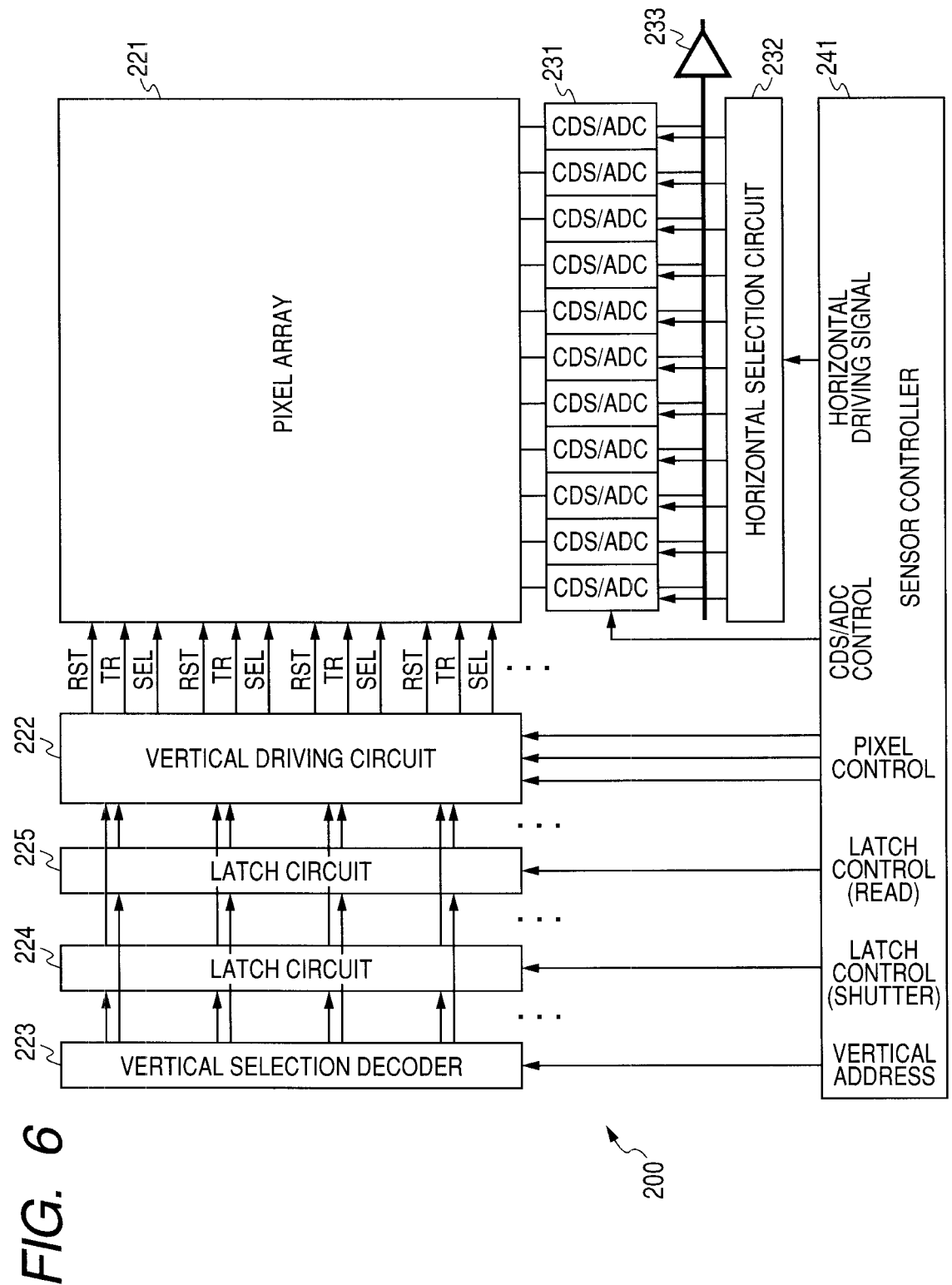
FIG. 6 is a block diagram illustrating an example of the configuration of an image sensor according to an embodiment of the present invention.

FIG. 6 is a block diagram illustrating an example of the configuration of an image sensor according to an embodiment of the present invention. An image sensor 200 shown in FIG. 6 is configured as a CMOS image sensor, for example.

In FIG. 6, a pixel array 221 is configured to include a plurality of pixels arrayed on a predetermined number of rows in the vertical direction and a predetermined number of columns in the horizontal direction. For example, in the case where the pixel array 221 includes pixels in N rows by M columns, N pixels in a vertical direction and M pixels in a horizontal direction (that is, N×M pixels) are arrayed in the pixel array 221. A photodiode that generates electric charges by photoelectrically converting exposed light and accumulates the electric charges is provided in each of the pixels, and an MOS transistor switch is connected to the photodiode. The MOS transistor switch amplifies electric charges accumulated in the photodiode on the basis of a pulse signal supplied and outputs the amplified electric charges as a signal (pixel signal corresponding to each pixel).

A vertical driving circuit 222 is configured to supply a driving signal to pixels on a predetermined one row of the pixel array 221. The vertical driving circuit 222 supplies to each pixel of the pixel array 221 an SEL signal for selecting pixels on a predetermined one row of the pixel array 221, a TR signal for outputting electric charges accumulated in the pixels selected by the SEL signal, and an RST signal for resetting the pixels selected by the SEL signal. In addition, signal lines used to supply the SEL signal, the TR signal, and the RST signal output from the vertical driving circuit 222 are provided as many as rows of pixels of the pixel array 221 and are connected to pixels on each row of the pixel array 221.

A vertical selection decoder 223 generates an address signal specifying pixels on a row, from which pixel signals are to be read, among pixels of the pixel array 221 on the basis of a control signal (vertical address signal in the drawing) supplied from a sensor controller 241 and supplies the address signal to the vertical driving circuit 222 and also generates an address signal specifying pixels on a row, on which a shutter operation of a pixel is to be performed, among the pixels of the pixel array 221 on the basis of the control signal supplied from the sensor controller 241 and supplies the address signal to the vertical driving circuit 222. That is, the vertical selection decoder 223 generates an address signal for selecting one read row and four electronic shutter rows within one horizontal scanning period (1 H period) through time-division multiplexing.

A latch circuit 224 is configured to hold the address signal supplied from the vertical selection decoder 223 on the basis of a control signal supplied from the sensor controller 241. The latch circuit 224 holds address signals of four electronic shutter rows corresponding to a read row within a 1 H period. In addition, the latch circuit 224 is provided with S-R latches the number of which is equal to the number of rows of pixels arrayed in the pixel array 221.

A latch circuit 225 is also configured to hold the address signal supplied from the vertical selection decoder 223 on the basis of a control signal supplied from the sensor controller 241. The latch circuit 225 holds an address signal of a read row within a 1 H period. In addition, the latch circuit 225 is also provided with S-R latches the number of which is equal to the number of rows of pixels arrayed in the pixel array 221.

That is, in the image sensor 200, four rows of pixels on which a shutter operation is to be performed by time-division multiplexing within the same horizontal scanning period as reading pixels on one row selected by the vertical selection decoder 223 are also selected by the vertical selection decoder 223. Then, the SEL signal, the TR signal, and the RST signal corresponding to one read row and the TR signal and the RST signal corresponding to four electronic shutter rows are supplied from the vertical driving circuit 222 to the pixel array 221 within the same horizontal scanning period.

A CDS/ADC 231 is configured to include a converter (ADC: analog digital converter) that converts an analog electric signal, which is obtained when signal charges photoelectrically converted by a photodiode are amplified and output, to a digital signal, and a correlated double sampling (CDS) circuit that removes a noise of an input electric signal and that corrects a variation in an electric signal resulting from a variation in the performance of each element forming a pixel and supplies the corrected signal to the converter.

A horizontal selection circuit 232 selects one predetermined column of the CDS/ADC 231 and outputs a digital signal to an inverter 233. In addition, a signal output from the inverter 233 becomes an output signal of the image sensor 200.

The sensor controller 241 generates a read row address and a shutter row address, which are supplied to the vertical selection decoder 223, as vertical address signals. In addition, the sensor controller 241 generates latch control signals (SLSET signal, SLRST signal, RLSET signal, and RLRST signal which will be described later) for controlling the latch circuit 224 and the latch circuit 225.

In addition, the sensor controller 241 generates the SEL signal, the TR signal, and the RST signal as pixel control signals. In addition, the sensor controller 241 generates a CDS/ADC control signal for controlling the CDS/ADC 31 and a horizontal driving signal for controlling the horizontal selection circuit 232.

Figure 7:
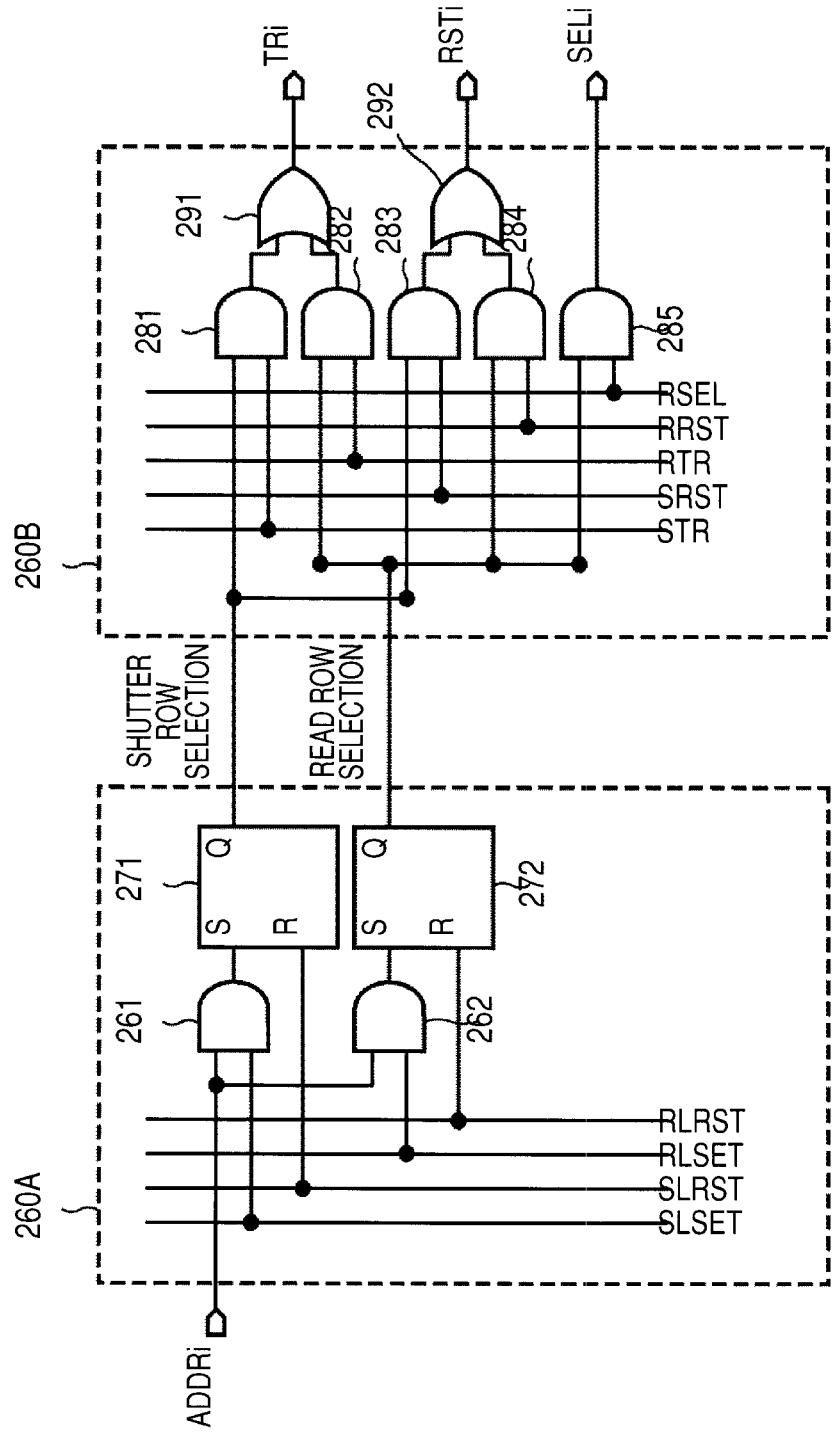
FIG. 7 is a circuit diagram illustrating an example of the detailed configuration of latch circuits and a vertical driving circuit shown in FIG. 6.

FIG. 7 is a circuit diagram illustrating an example of the detailed configuration of the latch circuit 224, the latch circuit 225, and the vertical driving circuit 222. FIG. 7 illustrates the configuration of a portion, which corresponds to pixels on one row of the pixel array 221, of the latch circuit 224, the latch circuit 225, and the vertical driving circuit 222 and shows an example of the configuration as a logic circuit. In addition, a TRi signal, an RSTi signal, and an SELi signal shown in FIG. 7 indicate signals, which correspond to pixels on a corresponding row, of the SEL signal, the TR signal, and the RST signal which are pixel control signals. That is, in FIG. 7, "i" is an identifier corresponding to the number of a corresponding row.

Furthermore, in FIG. 7, a region 260A shown by a dotted line indicates a configuration for one row of the latch circuit 224 and the latch circuit 225 shown in FIG. 6, and a region 260B shown by a dotted line indicates a configuration for one row of the vertical driving circuit 222 shown in FIG. 6. Therefore, circuits having the same configuration as the circuit shown in FIG. 7 are connected in parallel in the longitudinal direction in the drawing as many as the number of rows of pixels arrayed in the pixel array 221 (that is, the number of pixels in the vertical direction), thereby forming the latch circuit 224, the latch circuit 225, and the vertical driving circuit 222 shown in FIG. 6.

In addition, the circuit shown in FIG. 7 is a logic circuit. An ADDRi signal that is an address signal, an STR signal, an SRST signal, an RTR signal, an RRST signal, an RSEL signal, a TRi signal, an RSTi signal, and an SELi signal that are pixel control signals, and an SLSET signal, an SLRST signal, an RLSET signal, and an RLRST signal that are latch control signals are logic signals each having a value of "1" or "0" and are supplied as pulses formed by a change in a voltage value on a signal line, for example.

The ADDRi signal is an address signal supplied from the vertical selection decoder 223. For example, when a corresponding row is selected by the vertical selection decoder 223, a value of the ADDRi signal changes to "1".

An S-R latch 271 holds an address signal supplied from the vertical selection decoder 223 when a corresponding row is selected as a shutter row by the vertical selection decoder 223. An S-R latch 272 holds an address signal supplied from the vertical selection decoder 223 when a corresponding row is selected as a read row by the vertical selection decoder 223. The S-R latch 271 and the S-R latch 272 are configured such that signals output from an AND gate 261 and an AND gate 262, which are supplied to "S" terminals of the S-R latch 271 and the S-R latch 272, are held and output in "Q" terminals and the signals held and output in the "Q" terminals are reset at timing when values of signals supplied to "R" terminals change to "1".

That is, if a value of the SLSET signal changes to "1" when a value of the ADDRi signal is "1", a value of a signal output from the AND gate 261 also changes to "1". Accordingly, a signal supplied to the "S" terminal of the S-R latch 271 has a value of "1". In addition, the S-R latch 271 sets a signal, which is output from the "Q" terminal, to "1" until the SLRST signal supplied to the "R" terminal changes to "1".

Similarly, if a value of the RLSET signal changes to "1" when a value of the ADDRi signal is "1", a value of a signal output from the AND gate 262 also changes to "1". As a result, a signal supplied to the "S" terminal of the S-R latch 272 has a value of "1". In addition, the S-R latch 272 sets a signal, which is output from the "Q" terminal, to "1" until the RLRST signal supplied to the "R" terminal changes to "1".

If a value of the STR signal changes to "1" when a value of the signal output from the S-R latch 271 is "1", a value of a signal output from an AND gate 281 also changes to "1". Accordingly, the TRi signal output from an OR gate 291 has a value of "1". As a result, electric charges accumulated in pixels on a corresponding row are output, such that a shutter operation is performed.

Furthermore, if a value of the SRST signal changes to "1" when a value of the signal output from the S-R latch 271 is "1", a value of a signal output from an AND gate 283 also changes to "1". As a result, the RSTi signal output from an OR gate 293 has a value of "1". Thus, the pixels on the corresponding row are reset.

If a value of the RLSET signal changes to "1" when a value of the ADDRi signal is "1", a value of the signal output from the AND gate 262 also changes to "1". As a result, a signal supplied to the "S" terminal of the S-R latch 272 has a value of "1". In addition, the S-R latch 272 sets the signal, which is output from the "Q" terminal, to "1" until the RLRST signal supplied to the "R" terminal changes to "1".

If a value of the RSEL signal changes to "1" when a value of the signal output from the S-R latch 272 is "1", a value of the SELi signal output from an AND gate 285 changes to "1". Thus, pixels on the corresponding row are selected as pixels to be read.

Furthermore, if a value of the RTR signal changes to "1" when a value of the signal output from the S-R latch 272 is "1", a value of the signal output from the AND gate 282 also changes to "1". Accordingly, the TRi signal output from the OR gate 291 has a value of "1". As a result, electric charges accumulated in pixels on the corresponding row are output, such that reading of signals of the pixels on the corresponding row is performed.

Furthermore, if a value of the RRST signal changes to "1" when a value of the signal output from the S-R latch 272 is "1", a value of the signal output from the AND gate 284 also changes to "1". Accordingly, the RSTi signal output from the OR gate 292 has a value of "1". As a result, signals of the pixels on the corresponding row are reset.

Thus, the SEL signal, the TR signal, and the RST signal, which are pixel control signals and each of which has a value of "1" are supplied to the pixels on the corresponding row, such that the shutter operation and resetting or reading and resetting of a pixel signal are performed.

In addition, in the following description, it is assumed that an address signal, a pixel control signal, and a latch control signal are supplied to the logic circuit when a voltage value on a signal line connected to each terminal of the logic circuit corresponds to a logic value "1".

Figure 8:
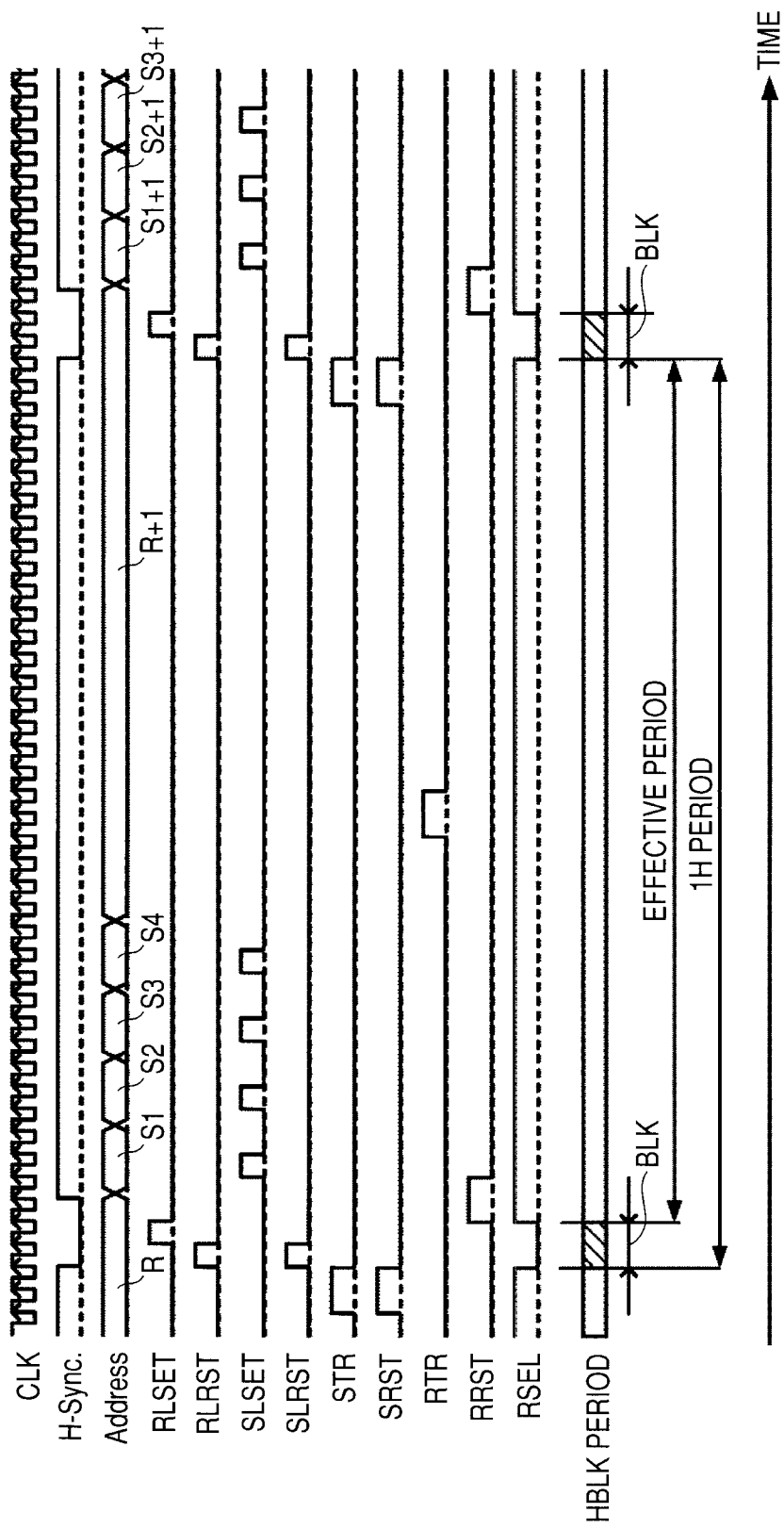
FIG. 8 is a timing chart explaining respective signals in the image sensor shown in FIG. 6.

FIG. 8 is a timing chart explaining respective signals in the image sensor 200 shown in FIG. 6

In FIG. 8, a CLK signal is a clock signal of the image sensor 200. In addition, an H-Sync signal is a horizontal synchronization signal and is used for synchronization of a 1 H period in the image sensor 200.

An Address signal is an address signal generated by the vertical selection decoder 223 and corresponds to the above-described ADDRi signal. In this example, an Address signal indicating addresses S1 to S4 of a shutter row within the same 1 H period is generated after an Address signal indicating an address R of a read row, and then an Address signal indicating an address R+1 of a read row within a next 1 H period of the address R is generated. Then, an Address signal indicating addresses S1+1, . . . of a shutter row within the next 1 H period of the address R is generated. The addresses S1 to S4 and the address R are all generated within the 1 H period. Thus, the vertical selection decoder 223 generates an address of one read row and addresses of four electronic shutter rows within the 1 H period.

The SLSET signal, the SLRST signal, the RLSET signal, and the RLRST signal are latch control signals for controlling the latch circuit 224 and the latch circuit 225 and are output from the sensor controller 241.

In the example shown in FIG. 8, the SLRST signal is first supplied to the latch circuit 224. Then, each of the plurality of S-R latches (S-R latch 271 shown in FIG. 7) that form the latch circuit 224 is reset. In addition, the SLSET signal as four pulses is supplied to the latch circuit 224 in a period for which the Address signal becomes the addresses S1 to S4. Then, each of the plurality of S-R latches that form the latch circuit 224 holds the Address signal corresponding to each of the addresses S1 to S4.

For example, in the case where a row corresponding to the circuit shown in FIG. 7 is a row specified by the address S1, when the SLSET signal is supplied to the latch circuit 224 at timing at which the Address signal is the address S1, a pulse is supplied to the S terminal of the S-R latch 271. Then, a signal output from the Q terminal of the S-R latch 271 has a value of "1". Thus, in the latch circuit 224, a value of a signal output from the Q terminal of the S-R latch 271 of a portion corresponding to each row of the addresses S1 to S4 changes to "1", such that the Address signal corresponding to each of the addresses S1 to S4 is held.

The STR signal is a signal for outputting electric charges as a shutter operation accumulated in pixels as described above. When a value of the STR signal changes to "1" in a state where the signal output from the S-R latch 271 shown in FIG. 7 has a value of "1", the shutter operation of pixels on the row is performed. Moreover, the SRST signal for resetting a pixel is also generated to be supplied at almost the same timing as the STR signal. Thus, the pixels on the corresponding row are reset.

The operation up to now is almost the same as that in the case described with reference to FIG. 5.

In the example shown in FIG. 8, the RLRST signal is supplied to the latch circuit 225 at almost the same timing as the SLRST signal is supplied to the latch circuit 224. Then, each of the plurality of S-R latches (S-R latch 272 shown in FIG. 7) that form the latch circuit 225 is reset. In addition, the RLSET signal as a pulse is supplied to the latch circuit 225 in a period for which the Address signal becomes the address R+1. Then, the plurality of S-R latches that form the latch circuit 225 hold the Address signal corresponding to the address R+1.

For example, in the case where a row corresponding to the circuit shown in FIG. 7 is a row specified by the address R+1, when the RLSET signal is supplied to the latch circuit 225 at timing at which the Address signal is the address R+1, a pulse is supplied to the S terminal of the S-R latch 272. Then, a signal output from the Q terminal of the S-R latch 272 has a value of "1". Thus, in the latch circuit 225, a value of a signal output from the Q terminal of the S-R latch 272 of a portion corresponding to a row of the address R+1 changes to "1", such that the Address signal corresponding to the addresses R+1 is held.

In addition, while the latch circuit 225 is holding the Address signal corresponding to the address R+1, the SELi signal is supplied from the vertical driving circuit 222 (AND gate 285 shown in FIG. 7) to pixels on a row corresponding to the address R+1.

As described above, the RTR signal, the RRST signal, and the RSEL signal are pixel control signals that the sensor controller 241 outputs in order to read a signal of a pixel.

The RSEL signal is a signal that the sensor controller 241 outputs within an effective period of a 1 H period. For example, when the RTR signal is supplied together with the RSEL signal while the Address signal indicating the address R+1 is being supplied, electric charges accumulated in pixels on a row corresponding to the Address R+1 are output. In this case, the electric charges that have been output are not swept out but output as a signal through processing of the CDS/ADC 231 to the inverter 233. Thus, reading of a signal of a pixel is performed.

In addition, for example, when the RRST signal is supplied together with the RSEL signal while the Address signal indicating the address R+1 is being supplied, pixels on a row corresponding to the Address R+1 are reset.

The sensor controller 241 generates a pulse of the RSEL signal by setting a period, for which reading of pixels (for example, pixels on a row corresponding to the address R+1) on one row can be performed, as an effective period and a period, for which reading of pixels (for example, pixels on the row corresponding to the address R+1) on one row cannot be performed, as a blanking (BLK) period.

In the case shown in FIG. 8, the BLK period is shorter than the case shown in FIG. 5. That is, since the latch circuit 225 (S-R latch 272 shown in FIG. 7) shown in FIG. 6 is provided, the Address signal indicating the Address R is held until the RLRST signal as a pulse is supplied after the RLSET signal as a pulse is supplied. Accordingly, the vertical selection decoder 223 can generate the addresses S1 to S4 of a shutter row immediately after the RLSET signal as a pulse is supplied.

In other words, in the case shown in FIG. 8, the vertical selection decoder 223 can generate the addresses S1 to S4 of a shutter row within a period for which the RSEL signal has a value of "1" (that is, within an effective period).

Thus, in the case shown in FIG. 8, it is possible to make the BLK period shorter than the case shown in FIG. 5. As a result, it is not necessary to make a 1 H period long.

Thus, in the image sensor 200 according to the embodiment of the present invention, it is possible to prevent the BLK period from becoming long even if the number of electronic shutter rows increases. As a result, for example, photographing can be performed at a high-speed frame rate.

In the case of a CMOS image sensor, it has been difficult to reduce the pixel size compared with a CCD image sensor. However, in recent years, it is possible to realize a fine pixel size by using a technique called pixel sharing. In an image sensor using a pixel sharing technique, for example, a floating diffusion that is a part of a transistor forming a pixel and temporarily holds electric charges accumulated in each pixel is shared among a plurality of pixels. Therefore, in the pixel sharing technique, it is possible to realize a configuration in which electric charges accumulated in a plurality of pixels are added in the floating diffusion and are read as signals.

In addition, a four pixel sharing technique of sharing four pixels including every two pixels of two colors, for example, like R, G, R, and G among three colors of RGB in pixels arrayed in a pixel array of Bayer arrangement is generally used as the pixel sharing technique.

Next, an example of a case in which the present invention is applied to an image sensor using a pixel sharing technique will be described.

Figure 9:
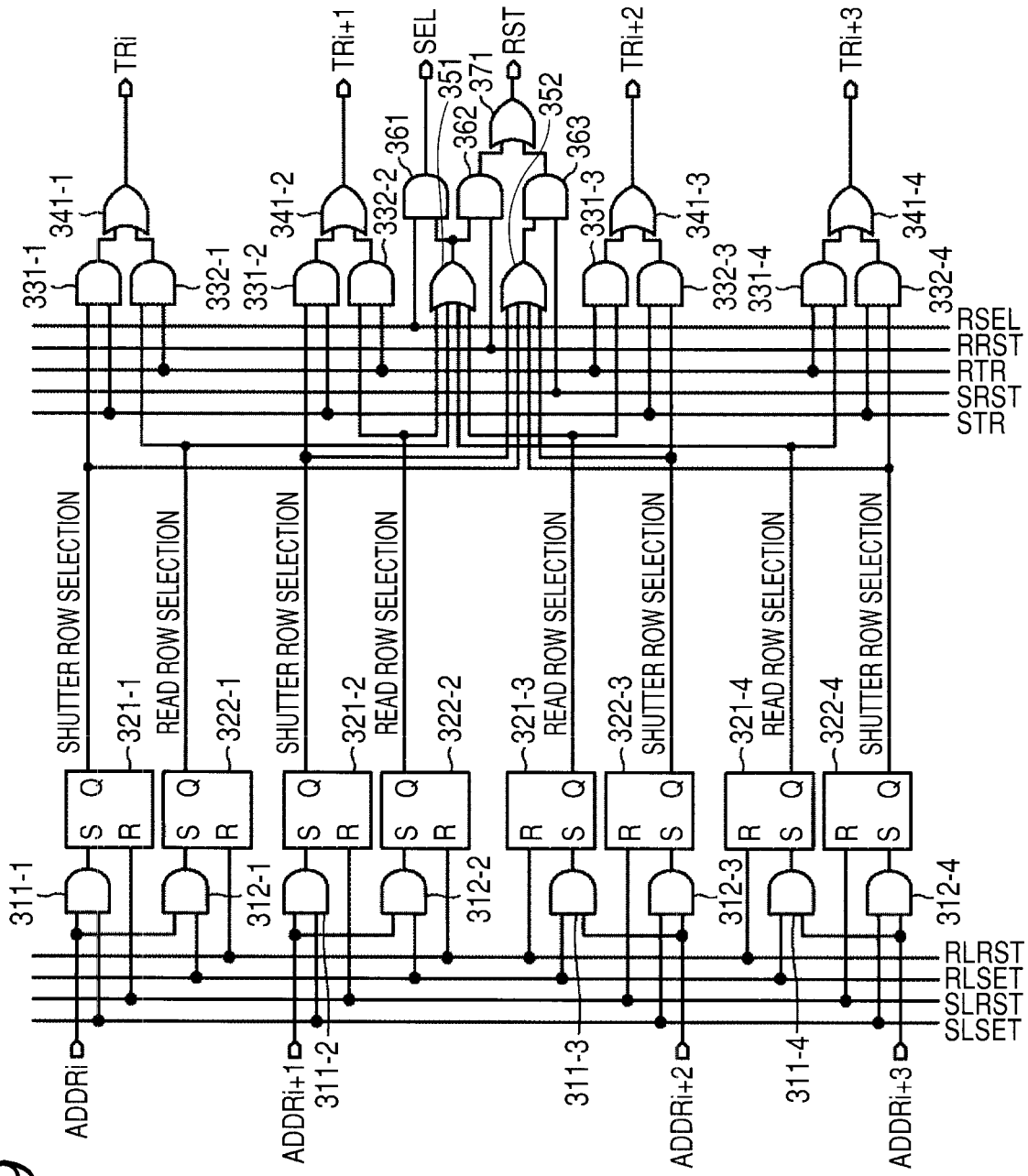
FIG. 9 is a circuit diagram illustrating an example of the detailed configuration of latch circuits and a vertical driving circuit in the case when the present invention is applied to an image sensor using a pixel sharing technique.

FIG. 9 is a circuit diagram illustrating an example of the detailed configuration of the latch circuit 224, the latch circuit 225, and the vertical driving circuit 222 in the case when the present invention is applied to an image sensor using a pixel sharing technique. FIG. 9 corresponds to FIG. 7 in a case where four pixels are shared and illustrates the configuration of a portion, which corresponds to pixels on four rows of an i-th row to an (i+3)-th row of the pixel array 221, of the latch circuit 224, the latch circuit 225, and the vertical driving circuit 222. FIG. 9 illustrates an example of the configuration as a logic circuit.

In the case shown in FIG. 9, an ADDRi signal, an ADDRi+1 signal, an ADDRi+2 signal, and an ADDRi+3 signal that are address signals supplied from the vertical selection decoder 223 are supplied almost simultaneously, for example.

S-R latches 321-1 to 321-4 hold address signals supplied from the vertical selection decoder 223 when a corresponding row is selected as a shutter row by the vertical selection decoder 223. S-R latches 322-1 to 322-4 hold address signals supplied from the vertical selection decoder 223 when a corresponding row is selected as a read row by the vertical selection decoder 223. In addition, in the case when the S-R latches 321-1 to 321-4 and the S-R latches 322-1 to 322-4 do not need to be particularly distinguished, the S-R latches 321-1 to 321-4 and the S-R latches 322-1 to 322-4 are simply expressed as the S-R latch 321 and the S-R latch 322, respectively.

The S-R latch 321 and the S-R latch 322 are configured such that signals output from the AND gate 261 and the AND gate 262, which are supplied to the "S" terminals of the S-R latch 321 and the S-R latch 322, are held and output in "Q" terminals and the signals held and output in the "Q" terminals are reset at timing when values of signals supplied to the "R" terminals change to "1".

That is, as for pixels on an i-th row, if a value of the SLSET signal changes to "1" when a value of the ADDRi signal is "1", a value of a signal output from an AND gate 311-1 also changes to "1". As a result, a signal supplied to an "S" terminal of the S-R latch 321-1 has a value of "1". In addition, the S-R latch 321-1 sets a signal, which is output from the "Q" terminal, to "1" until the SLRST signal supplied to the "R" terminal changes to "1".

Similarly, if a value of the RLSET signal changes to "1" when a value of the ADDRi signal is "1", a value of a signal output from an AND gate 312-1 also changes to "1". As a result, a signal supplied to the "S" terminal of the S-R latch 322-1 has a value of "1". In addition, the S-R latch 322-1 sets the signal, which is output from the "Q" terminal, to "1" until the RLRST signal supplied to the "R" terminal changes to "1".

The same is true for pixels on (i+1)-th to (i+3)-th rows.

If a value of the STR signal changes to "1" when a value of the signal output from the S-R latch 321 is "1", values of signals output from AND gates 331-1 to 331-4 also change to "1". Accordingly, a TRi signal, a TRi+1 signal, a TRi+2 signal, and a TRi+3 signal output from OR gates 341-1 to 341-4 have values of "1". As a result, electric charges accumulated in pixels on i-th to (i+3)-th rows are output, such that a shutter operation is performed.

In addition, when a value of the signal output from the S-R latch 321 is "1", a signal output from an OR gate 352 has a value of "1". In this state, when a value of the SRST signal changes to "1", a value of a signal output from an AND gate 363 also changes to "1". As a result, an RST signal output from an OR gate 371 has a value of "1". Thus, the pixels on the i-th to (i+3)-th rows are reset. In addition, in the case of the pixel sharing technique, it is preferable that one RST signal be supplied to a plurality of pixels (four pixels in a current case) shared.

When a value of a signal output from the S-R latch 322 is "1", a value of a signal output from an OR gate 351 also changes to "1". In this state, when the RSEL signal changes to "1", an SEL signal output from an AND gate 361 has a value of "1". Thus, the pixels on the i-th to (i+3)-th rows are selected as pixels to be read. Moreover, in the case of the pixel sharing technique, it is preferable that one SEL signal be supplied to a plurality of pixels (four pixels in a current case) shared.

Furthermore, if a value of the RTR signal changes to "1" when a value of the signal output from the S-R latch 322 is "1", values of signals output from AND gates 332-1 to 332-4 also change to "1". Accordingly, a TRi signal, a TRi+1 signal, a TRi+2 signal, and a TRi+3 signal output from OR gates 341-1 to 341-4 have values of "1". As a result, electric charges accumulated in pixels on the i-th to (i+3)-th rows are output, such that reading of signals of the pixels on the i-th to (i+3)-th rows is performed.

In addition, when a value of the signal output from the S-R latch 322 is "1", a signal output from an OR gate 351 also has a value of "1". In this state, when a value of the RRST signal changes to "1", a value of a signal output from an AND gate 362 also changes to "1". As a result, an RST signal output from an OR gate 371 has a value of "1". Thus, the pixels on the i-th to (i+3)-th rows are reset.

Here, although the case of the four pixel sharing technique has been described as an example, the number of pixels shared is not limited thereto.

Figure 10:
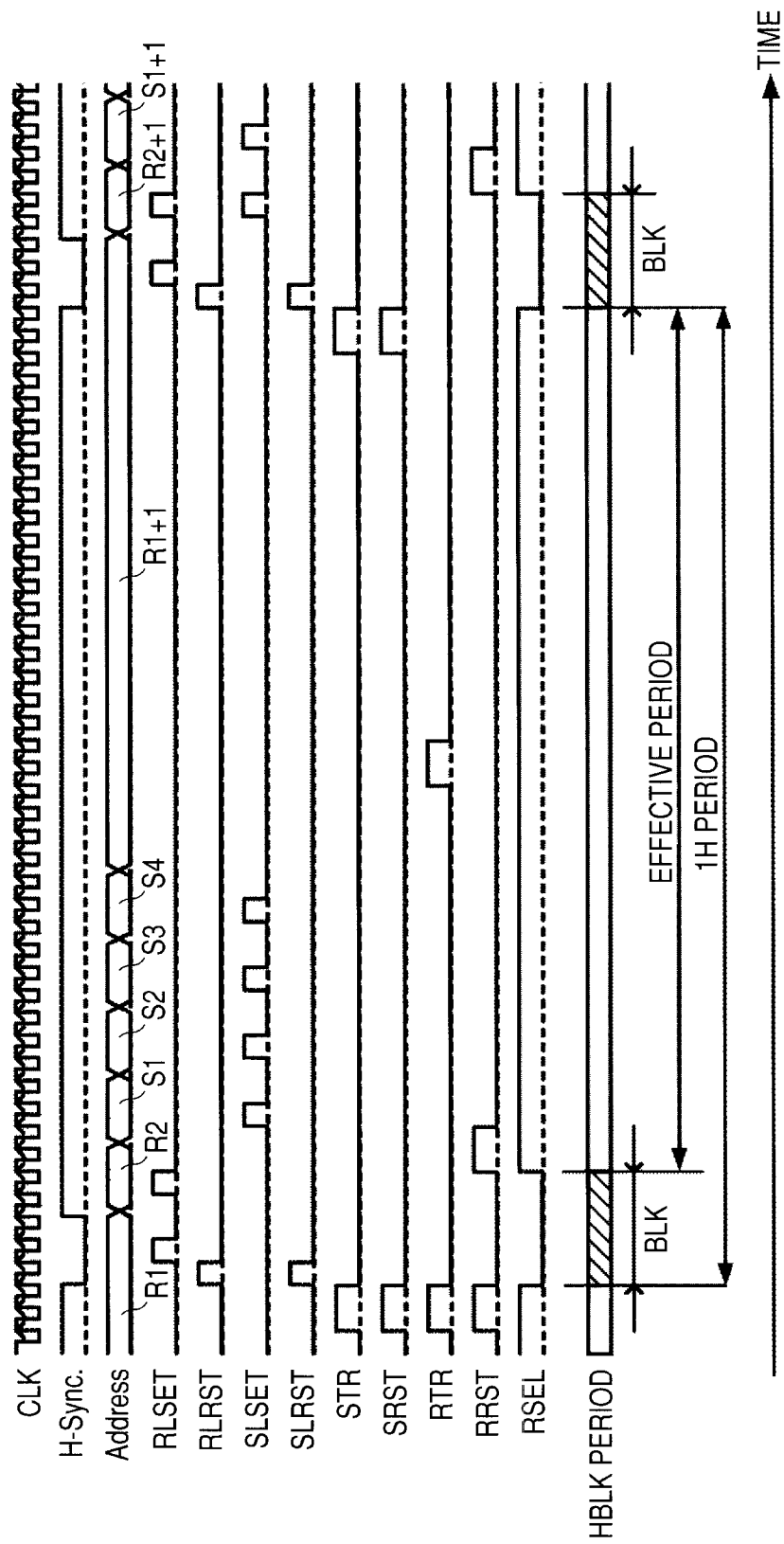
FIG. 10 is a timing chart explaining respective signals in the case when the image sensor shown in FIG. 6 is an image sensor using a pixel sharing technique.

FIG. 10 is a timing chart explaining respective signals in the case when the image sensor 200 shown in FIG. 6 is an image sensor using a pixel sharing technique. Here, the image sensor 200 is an image sensor using a four pixel sharing technique, and an example of a case of adding and reading signals of two pixels having the same color within a 1 H period will be described.

Since a CLK signal and an H-Sync signal in FIG. 10 are similar to those in FIG. 8, a detailed explanation thereof will be omitted.

In the case shown in FIG. 10, an Address signal is an address signal generated by the vertical selection decoder 223. In this example, addresses S1 to S4 of a shutter row within the same 1 H period are generated after an Address signal indicating an address R1 and an address R2 of a read row of two pixels, which have the same color (for example, R), among pixels shared, and then an address R1+1 and an address R2+1 of a read row of two pixels having the same color (for example, G), which are read within a next 1 H period, are generated. Then, an address S1+1, . . . of a shutter row within the next 1 H period of the address R is generated. The addresses S1 to S4, the address R1, and the address R2 are all generated within the 1 H period.

Thus, the vertical selection decoder 223 generates addresses of two read rows and addresses of four electronic shutter rows within the 1 H period.

The SLSET signal, the SLRST signal, the RLSET signal, and the RLRST signal are latch control signals for controlling the latch circuit 224 and the latch circuit 225 and are output from the sensor controller 241.

In the example shown in FIG. 10, the SLRST signal is first supplied to the latch circuit 224. Then, each of the plurality of S-R latches (S-R latch 321 shown in FIG. 9) that form the latch circuit 224 is reset. In addition, the SLSET signal as four pulses is supplied to the latch circuit 224 in a period for which the Address signal becomes the addresses S1 to S4. Then, each of the plurality of S-R latches that form the latch circuit 224 holds the Address signal corresponding to each of the addresses S1 to S4.

The STR signal is a signal for outputting electric charges accumulated in pixels as a shutter operation as described above. If a value of the STR signal changes to "1" when a value of a signal output from the S-R latch 321 shown in FIG. 9 is "1", values of the TRi signal, the TRi+1 signal, the TRi+2 signal, and the TRi+3 signal output from the OR gates 341-1 to 341-4 change to "1". As a result, a shutter operation of pixels on the corresponding rows is performed. Moreover, the SRST signal for resetting a pixel is also generated to be supplied at almost the same timing as the STR signal. Thus, the pixels on the corresponding rows are reset.

In the example shown in FIG. 10, the RLRST signal is supplied to the latch circuit 225 at almost the same timing as the SLRST signal is supplied to the latch circuit 224. Then, each of the plurality of S-R latches (S-R latch 322 shown in FIG. 9) that form the latch circuit 225 is reset. In addition, the RLSET signal as a pulse is supplied to the latch circuit 225 in a period for which the Address signal becomes the address R1+1, and the RLSET signal as a pulse is supplied to the latch circuit 225 in a period for which the Address signal becomes the address R2+1. Thus, the plurality of S-R latches that form the latch circuit 225 hold the Address signal corresponding to the address R1+1 and the Address signal corresponding to the address R2+1.

In addition, while the latch circuit 225 is holding the Address signal corresponding to the address R1+1 and the Address signal corresponding to the address R2+1, the SEL signal is supplied from the vertical driving circuit 222 (AND gate 361 shown in FIG. 7) to pixels on rows corresponding to the address R1+1 and the address R2+1.

As described above, the RTR signal, the RRST signal, and the RSEL signal are pixel control signals that the sensor controller 241 outputs in order to read a signal of a pixel.

The RSEL signal is a signal that the sensor controller 241 outputs within an effective period of a 1 H period. For example, when the RTR signal is supplied together with the RSEL signal while the Address signal corresponding to the address R1+1 and the Address signal corresponding to the address R2+1 are being supplied, electric charges accumulated in pixels on rows corresponding to the address R1+1 and the address R2+1 are output. Thus, reading of a signal of a pixel is performed.

In addition, for example, when the RRST signal is supplied together with the RSEL signal while the Address signal corresponding to the address R1+1 and the Address signal corresponding to the address R2+1 are being supplied, pixels on the rows corresponding to the address R1+1 and the address R2+1 are reset.

The sensor controller 241 generates a pulse of the RSEL signal by setting a period, for which reading of pixels on two rows (for example, pixels on rows corresponding to the address R1+1 and the address R2+1) can be performed, as an effective period and a period, for which reading of pixels on two rows (for example, pixels on rows corresponding to the address R1+1 and the address R2+1) cannot be performed, as a blanking (BLK) period.

Also in the case shown in FIG. 10, the BLK period is short similar to the case shown in FIG. 8. That is, since the latch circuit 225 (S-R latch 322 shown in FIG. 9) shown in FIG. 6 is provided, the Address signal indicating the address R1 and the address R2 is held until the RLRST signal as a pulse is supplied after the RLSET signal as a pulse is supplied. Accordingly, the vertical selection decoder 223 can generate the addresses S1 to S4 of a shutter row immediately after the RLSET signal as a pulse is supplied.

In other words, also in the case shown in FIG. 10, the vertical selection decoder 223 can generate the addresses S1 to S4 of a shutter row within a period for which the RSEL signal has a value of "1" (that is, within an effective period).

Thus, it is possible to make the BLK period shorter than the case shown in FIG. 5. As a result, it is not necessary to make a 1 H period long.

As described above, the present invention can also be applied to the case in which the image sensor 200 according to the embodiment of the present invention is an image sensor using a pixel sharing technique. As a result, since it is not necessary to make the BLK period long even if the number of electronic shutter rows increases, photographing can be performed at a high-speed frame rate, for example.

In the explanation referring to FIG. 10, the Address signal indicating the address S1 and the address R2 of a read row of two pixels having the same color (for example, R) and the addresses S1 to S4 of a shutter row are generated within a 1 H period. In this case, however, the vertical selection decoder 223 generates the address R1 and the address R2 within the same 1 H period by time-division multiplexing.

However, depending on the configuration of the vertical selection decoder 223, it is also possible to generate the address R1 and the address R2 at the same time without performing time-division multiplexing.

Figure 11:
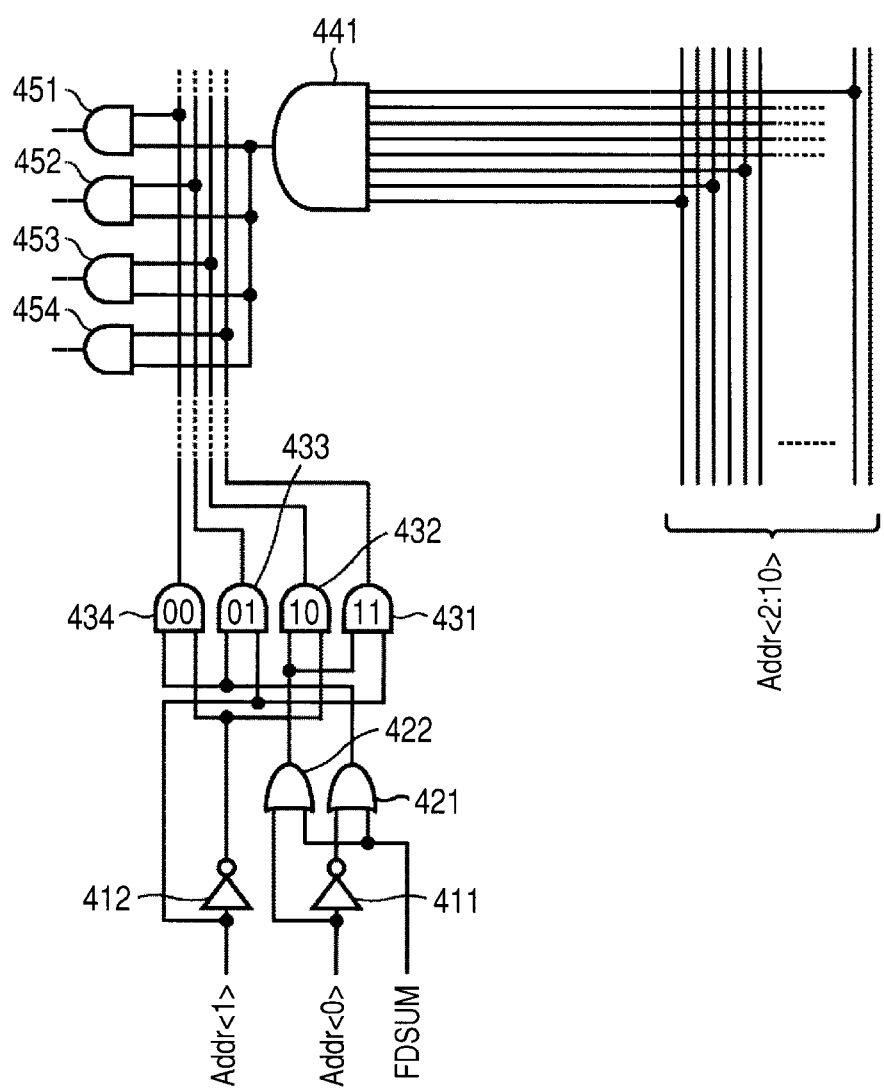
FIG. 11 is a circuit diagram illustrating an example of the detailed configuration of a vertical selection decoder in the case of simultaneously generating address signals for two rows without performing time-division multiplexing.

FIG. 11 is a circuit diagram illustrating an example of the detailed configuration of the vertical selection decoder 223 in the case of simultaneously generating address signals for two rows of the address R1 and the address R2 without performing time-division multiplexing. In FIG. 11, an 11-bit address signal is supplied as an address signal specifying a predetermined row of a pixel arrayed in the pixel array 221.

Here, it is assumed that the 11-bit address described above is expressed as Addr <0> to Addr <10>. Accordingly, for example, upper 2 bits of the 11-bit address are expressed as Addr <0> and Addr <1>, and lower 9 bits are expressed as Addr <2:10>. In addition, an FDSUM signal is a signal supplied in the case when address signals for two rows are simultaneously generated in the vertical selection decoder.

The bit Addr<0> is supplied to an inverter 411, and the bit Addr<1> is supplied to an inverter 412.

First, a case where the FDSUM signal has a value of "0" will be described. In the case when upper 2 bits of the 11-bit address are "11", signals output from the inverters 411 and 412 have values of "0", a signal output from the OR gate 421 has a value of "0", and a signal output from the OR gate 422 has a value of "1". In this state, a signal output from an AND gate 431 has a value of "1", and signals output from AND gates 432 to 434 have values of "0".

In the case when upper 2 bits of the 11-bit address are "10", a signal output from the inverter 411 has a value of "0", a signal output from the inverter 412 has a value of "1", a signal output from the OR gate 421 has a value of "0", and a signal output from the OR gate 422 has a value of "1". In this state, a signal output from the AND gate 432 has a value of "1", and signals output from the AND gates 431, 433, and 434 have values of "0".

Similarly, in the case when upper 2 bits of the 11-bit address are "01", a signal output from the AND gate 433 has a value of "1", and signals output from the AND gates 431, 432, and 434 have values of "0". Moreover, in the case when upper 2 bits of the 11-bit address are "00", a signal output from the AND gate 434 has a value of "1", and signals output from the AND gates 431 to 433 have values of "0".

Next, a case where the FDSUM signal has a value of "1" will be described. In the case when upper 2 bits of the 11-bit address are "11", signals output from the inverters 411 and 412 have values of "0", a signal output from the OR gate 421 has a value of "1", and a signal output from the OR gate 422 has a value of "1". In this state, signals output from the AND gates 431 and 433 have values of "1", and signals output from the AND gates 432 and 434 have values of "0".

In the case when upper 2 bits of the 11-bit address are "10", a signal output from the inverter 411 has a value of "0", a signal output from the inverter 412 has a value of "1", a signal output from the OR gate 421 has a value of "1", and a signal output from the OR gate 422 has a value of "1". In this state, signals output from the AND gates 432 and 434 have values of "1", and signals output from the AND gates 431 and 433 have values of "0".

Similarly, in the case when upper 2 bits of the 11-bit address are "01", signals output from the AND gates 431 and 433 have values of "1", and signals output from the AND gates 432 and 434 have values of "0". Furthermore, in the case when upper 2 bits of the 11-bit address are "00", signals output from the AND gates 432 and 434 have values of "1", and signals output from the AND gates 431 and 433 have values of "0".

A gate 441 is configured to supply 9 bits corresponding to Addr<2:10> to gates 451 to 454.

The gate 451 is configured to output an address signal by setting upper 2 bits as "00" and lower 9 bits as Addr <2:10> when the signal output from the AND gate 434 has a value of "1".

The gate 452 is configured to output an address signal by setting upper 2 bits as "01" and lower 9 bits as Addr <2:10> when the signal output from the AND gate 433 has a value of "1".

The gate 453 is configured to output an address signal by setting upper 2 bits as "10" and lower 9 bits as Addr <2:10> when the signal output from the AND gate 432 has a value of "1".

The gate 454 is configured to output an address signal by setting upper 2 bits as "11" and lower 9 bits as Addr <2:10> when the signal output from the AND gate 431 has a value of "1".

Accordingly, for example, when "00111111111" is supplied as a read row address from the sensor controller 241, the vertical selection decoder 223 can simultaneously generated address signals corresponding to two addresses of "00111111111" and "10111111111".

Thus, if the vertical selection decoder 223 is configured as shown in FIG. 11 and the FDSUM signal is set to have a value of "1", the vertical selection decoder 223 can generate two read row addresses or two shutter row addresses and supply the generated addresses to the latch circuit 225 when the sensor controller 241 generates one read row address or one shutter row address and supplies the generated address to the vertical selection decoder 223.

Figure 12:
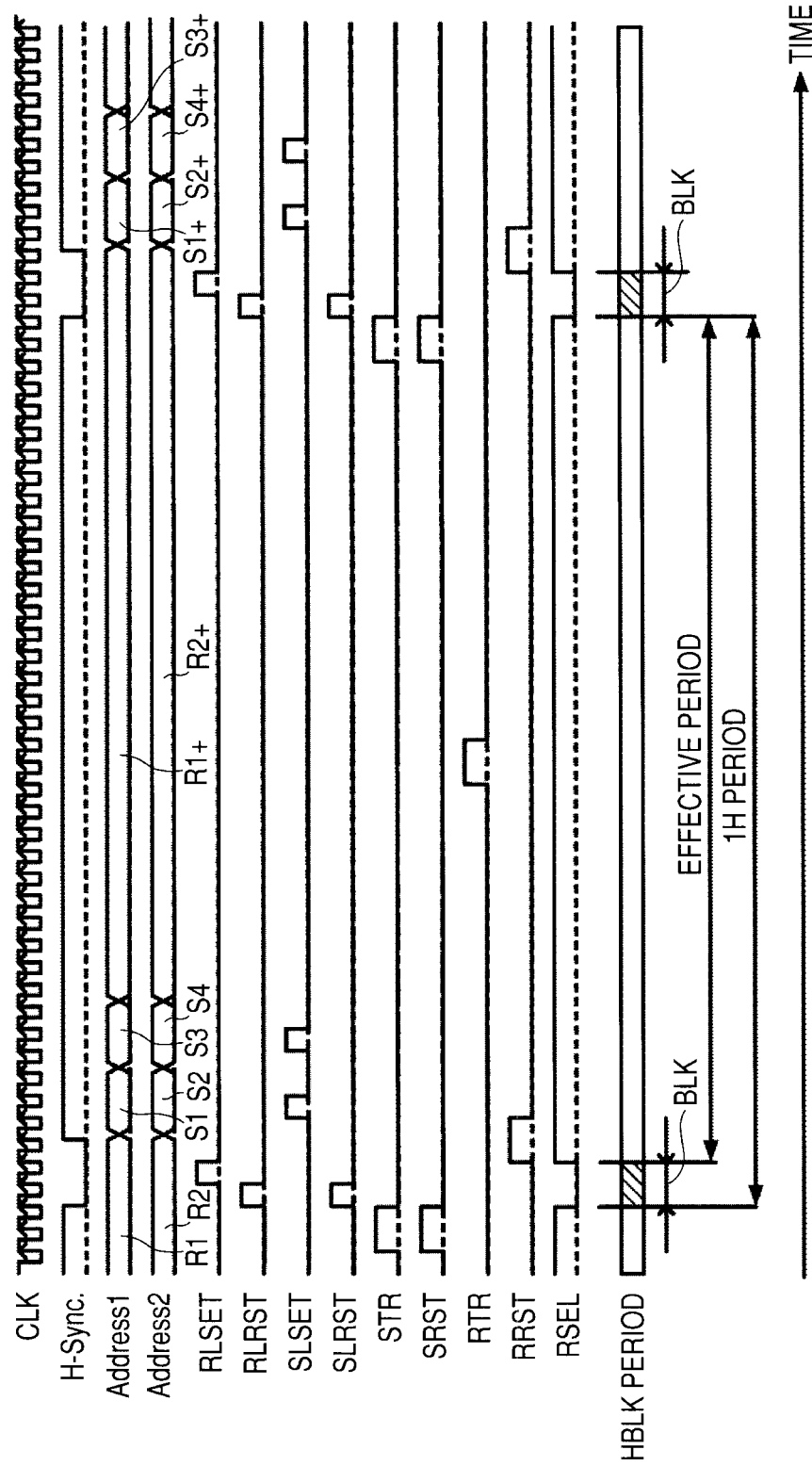
FIG. 12 is a timing chart explaining respective signals in the case where the image sensor shown in FIG. 6 is an image sensor using a pixel sharing technique and a vertical selection decoder has a configuration shown in FIG. 11.

FIG. 12 is a timing chart explaining respective signals in the case where the image sensor 200 shown in FIG. 6 is an image sensor using a pixel sharing technique and the vertical selection decoder 223 has the above configuration described with reference to FIG. 11. Here, the image sensor 200 is an image sensor using a four pixel sharing technique, and an example of a case of adding and reading signals of two pixels having the same color within a 1 H period will be described.

Since a CLK signal and an H-Sync signal in FIG. 12 are similar to those in FIG. 10, a detailed explanation thereof will be omitted.

In the case shown in FIG. 12, unlike the case shown in FIG. 10, an Address1 signal and an Address2 signal indicating an address R1 and an address R2 of a read row of two pixels, which have the same color (for example, R), among pixels shared are generated at the same time. In addition, addresses S1 and S3 of a shutter row within the same 1 H period as the addresses R1 and R2 of the read row are generated as the Address1 signal, and at the same time, the addresses S2 and S4 of a shutter row are generated as the Address2 signal. Then, the Address1 signal and the Address2 signal indicating an address R1+1 and an address R2+1 of a read row of two pixels, which have the same color (for example, G), read within a next 1 H period are generated at the same time. Thereafter, addresses S1+1 and S3+1 of a shutter row within the next 1 H period of the addresses R1 and R2 are generated as the Address1 signal, and at the same time, addresses S2+1 and S4+1 are generated as the Address2 signal.

Also in the case shown in FIG. 12, the addresses S1 to S4, the address R1, and the address R2 are all generated within the 1 H period. Thus, the vertical selection decoder 223 also generates addresses of two read rows and addresses of four electronic shutter rows within the 1 H period.

In the example shown in FIG. 12, the SLRST signal is also first supplied to the latch circuit 224. Then, each of the plurality of S-R latches (S-R latch 321 shown in FIG. 9) that form the latch circuit 224 is reset. In addition, the SLSET signal as two pulses is supplied to the latch circuit 224 in a period for which the Address1 signal becomes the addresses S1 and S3 (that is, in a period for which the Address2 signal becomes the addresses S2 and S4). Thus, each of the plurality of S-R latches that form the latch circuit 224 holds the Address1 signal and the Address2 signal corresponding to each of the addresses S1 to S4.

Since the STR signal and the SRST signal are the same as those in the above case described with reference to FIG. 10, a detailed explanation thereof will be omitted.

Furthermore, in the example shown in FIG. 12, the RLRST signal is supplied to the latch circuit 225 at almost the same timing as the SLRST signal is supplied to the latch circuit 224. Then, each of the plurality of S-R latches (S-R latch 322 shown in FIG. 9) that form the latch circuit 225 is reset. In addition, the RLSET signal as a pulse is supplied to the latch circuit 225 in a period for which the Address1 signal becomes the address R1+1 (that is, in a period for which the Address2 signal becomes the address R2+1). Thus, the plurality of S-R latches that form the latch circuit 225 hold the Address1 signal corresponding to the address R1+1 and the Address2 signal corresponding to the address R2+1.

Since the RTR signal, the RRST signal, and the RSEL signal are the same as those in the above case described with reference to FIG. 10, a detailed explanation thereof will be omitted.

Also in the case shown in FIG. 12, a BLK period is short similar to the case shown in FIG. 8, but the BLK period is much shorter than that in the case shown in FIG. 10. That is, it becomes possible to shorten a period, for which a read row address is to be supplied from the vertical selection decoder 223, by configuring the vertical selection decoder 223 as described above with reference to FIG. 11. Thus, it becomes possible to further shorten a BLK period compared with the case shown in FIG. 10.

Furthermore, although an example of a logic circuit that performs a logic operation by mainly using an AND gate and an OR gate has been described in the above example mentioned with reference to FIGS. 7 to 12, it may be possible to form a logic circuit that performs a logic operation by mainly using a NAND gate and a NOR gate. For example, in the case of applying the present invention to an image sensor mounted in a product, a logic circuit that performs the same logic operation as the logic circuits shown in FIGS. 7, 9, and 11 may be formed by mainly using a NAND gate and a NOR gate.

Moreover, in the above description, the case of the ½ thinning-out read mode has been explained as an example. However, the present invention may also be applied to cases of other thinning-out read modes. For example, by applying the present invention to a case where the number of electronic shutter rows increases, for example, a case of a ¼ thinning-out read mode or a ⅛ thinning-out read mode, it is also possible to prevent the BLK period from becoming long. As a result, photographing can be performed at a high-speed frame rate, for example.

Figure 13:
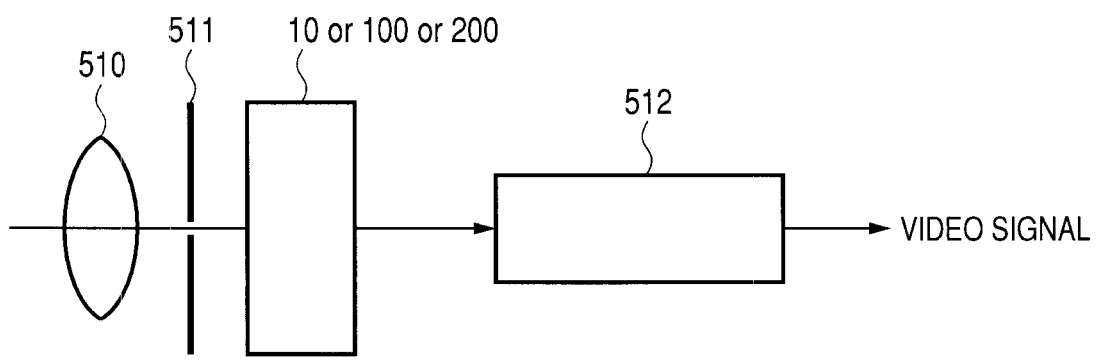
FIG. 13 is a block diagram illustrating a camera according to an embodiment of the present invention.

FIG. 13 is a cross-sectional view illustrating a camera according to each embodiment of the present invention. The camera according to the present embodiment is an example of a video camera capable of photographing a still image or a moving image.

The camera according to the present embodiment includes the image sensor 10, 100, or 200, an optical system 510, a mechanical shutter device 511, and a signal processing circuit 512.

The optical system 510 makes image light (incident light) from a subject body imaged on an imaging surface of the image sensor 10, 100, or 200. As a result, corresponding signal charges are accumulated within the image sensor 10, 100, or 200 for a predetermined period.

The mechanical shutter device 511 controls a light irradiation period and a light blocking period with respect to the image sensor 10, 100, or 200.

The signal processing circuit 512 performs various kinds of signal processing. A video signal subjected to signal processing is stored in a storage medium, such as a memory, or output to a monitor.

In the above embodiment, the case where the present invention is applied to the image sensor 10, 100, or 200, in which unit pixels that detect signal charges corresponding to the light amount of visible light as a physical amount are arrayed in a matrix, has been described as an example. However, the present invention is not limited to being applied to the image sensor 10, 100, or 200 but may also be applied to all kinds of column type solid-state imaging devices in which a column circuit is disposed for every pixel column of a pixel array section.

Furthermore, the present invention is not limited to being applied to a solid-state imaging device that detects the distribution of incident light amount of visible light and images the distribution as an image but may also be applied to a solid-state imaging device that images infrared rays or X rays or the distribution of incident amount of particles and the like as an image or in a broader meaning, to all kinds of solid-state imaging devices (physical amount distribution detecting devices), such as a fingerprint detecting sensor, which detect the distribution of another physical amount, such as pressure or electrostatic capacitance, and images the distribution as an image.

Furthermore, the present invention is not limited to being applied to a solid-state imaging device that sequentially scans unit pixels of a pixel array section in the unit of a row and reads a pixel signal from each of the unit pixels but may also be applied to an X-Y address type solid-state imaging device that selects an arbitrary pixel in the unit of a pixel and reads a signal from the selected pixel in the unit of a pixel.

Furthermore, a solid-state imaging device may be formed in the form of one chip or may be formed in the form of a module having an imaging function in a state where an imaging section and a signal processing section or an optical system are packaged in groups.

In addition, the present invention is not limited to being applied to solid-state imaging devices but may also be applied to imaging apparatuses. Here, the imaging apparatuses refer to a camera system, such as a digital still camera or a video camera, or an electronic apparatus having an imaging function, such as a mobile phone. In addition, the form of a module mounted in an electronic apparatus, that is, a camera module may be an imaging apparatus.

By using the image sensor 10, 100, or 200 according to the above-described embodiment as a solid-state imaging device in a video camera or a digital still camera or an imaging apparatus, such as a camera module for a mobile apparatus such as a mobile phone, it is possible to obtain a high-quality image with a simple configuration in the image sensor 10, 100, or 200.

It should be understood by those skilled in the art that various modifications, combinations, sub-combinations and alterations may occur depending on design requirements and other factors insofar as they are within the scope of the appended claims or the equivalents thereof.

What is claimed is:

1. An image sensor that supplies a control signal together with an address specifying each of a plurality of pixels arrayed in a pixel array with predetermined rows and columns to thereby perform an electronic shutter operation on a pixel corresponding to the address or perform reading of a pixel signal of a pixel corresponding to the address, comprising:
   an address generating unit configured to generate (a) one or more shutter row addresses specifying one or more rows of pixels, on which an electronic shutter operation is to be performed within one horizontal period, among the pixels arrayed in the pixel array and (b) a read row address specifying a row of pixels on which reading of a pixel signal is to be performed within the one horizontal period;
   a first storage unit configured to store the shutter row address generated by the address generating unit; and
   a second storage unit configured to store the read row address generated by the address generating unit,
   wherein,
   the address generating unit generates all the one or more shutter row addresses within an effective period of the one horizontal period, the effective period being part of the one horizontal period in which a selection pulse of the row of pixels specified by the read row address is in an ON state.

2. The image sensor according to claim 1, wherein the address generating unit generates a plurality of shutter row addresses corresponding to one read row address.

3. The image sensor according to claim 1, wherein the address generating unit generates the read row address and the one or more shutter row addresses corresponding to the read row address within the one horizontal period through time-division multiplexing.

4. The image sensor according to claim 1, wherein the pixel array is a pixel array using a pixel sharing technique of sharing floating diffusion of a pixel.

5. The image sensor according to claim 4, wherein the address generating unit generates a plurality of read row addresses to be read within the one horizontal period and generates a plurality of shutter row addresses corresponding to the plurality of read row addresses.

6. The image sensor according to claim 4, wherein the address generating unit simultaneously generates a plurality of read row addresses to be read within one horizontal period and simultaneously generates a plurality of shutter row addresses corresponding to the plurality of read row addresses.

7. The image sensor according to claim 1, wherein:
each of the first storage unit and the second storage unit is configured to include a plurality of S-R latches corresponding to respective rows of pixels arrayed in the pixel array, and
the one ore more shutter row addresses or the read row address is stored when the S-R latches hold address signals supplied to the S-R latches corresponding to a row of pixels of the shutter row address or the read row address, the address signals being address signals supplied to the S-R latches on the basis of the shutter row address or the read row address generated by the address generating unit.

8. The image sensor according to claim 7, wherein each of the plurality of S-R latches is reset by a reset pulse, which is supplied once at predetermined timing within one horizontal period, and holds the address signals by a set pulse that is supplied once or a plural number of times within one horizontal period corresponding to timing at which the address signals are supplied after the reset pulse is supplied.

9. An electronic apparatus that supplies a control signal together with an address specifying each of a plurality of pixels arrayed in a pixel array with predetermined rows and columns to thereby perform an electronic shutter operation on a pixel corresponding to the address or perform reading of a pixel signal of a pixel corresponding to the address, comprising:
an address generating unit configured to generate (a) one or more shutter row addresses specifying one or more rows of pixels, on which an electronic shutter operation is to be performed within one horizontal period, among the pixels arrayed in the pixel array and (b) a read row address specifying a row of pixels on which reading of a pixel signal is to be performed within the one horizontal period;
a first storage unit configured to store the one or more shutter row addresses generated by the address generating unit; and
a second storage unit configured to store the read row address generated by the address generating unit,
wherein,
the address generating unit generates all the one or more shutter row addresses within an effective period of the one horizontal period, the effective period being part of the one horizontal period in which a selection pulse of the row of pixels specified by the read row address is in an ON state.

10. A driving method of an electronic apparatus that supplies a control signal together with an address specifying each of a plurality of pixels arrayed in a pixel array with predetermined rows and columns to thereby perform an electronic shutter operation on a pixel corresponding to the address or perform reading of a pixel signal of a pixel corresponding to the address, comprising the steps of:
generating (a) one or more shutter row addresses specifying one or more rows of pixels, on which an electronic shutter operation is to be performed within one horizontal period, among the pixels arrayed in the pixel array and (b) a read row address specifying a row of pixels on which reading of a pixel signal is to be performed within the one horizontal period;
storing the shutter row address in a first storage unit; and
storing the read row address in a second storage unit,
wherein,
all the one or more shutter row addresses are generated within an effective period of the one horizontal period, the effective period being part of the one horizontal period in which a selection pulse of the row of pixels specified by the read row address is in an ON state.

* * * * *